(12) United States Patent
Park et al.

(10) Patent No.: US 9,763,208 B2
(45) Date of Patent: Sep. 12, 2017

(54) METHOD AND APPARATUS FOR SUPPORTING SYNCHRONIZATION IN D2D COMMUNICATION

(71) Applicant: Samsung Electronics Co., Ltd., Gyeonggi-do (KR)

(72) Inventors: Seung-Hoon Park, Seoul (KR); Hyun-Seok Ryu, Gyeonggi-do (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 99 days.

(21) Appl. No.: 14/666,035

(22) Filed: Mar. 23, 2015

(65) Prior Publication Data

US 2015/0271771 A1 Sep. 24, 2015

(30) Foreign Application Priority Data

| Mar. 21, 2014 | (KR) | 10-2014-0033710 |
| Mar. 28, 2014 | (KR) | 10-2014-0037206 |
| May 9, 2014 | (KR) | 10-2014-0055941 |
| Aug. 7, 2014 | (KR) | 10-2014-0101993 |
| Nov. 6, 2014 | (KR) | 10-2014-0153917 |

(51) Int. Cl.
*H04J 3/06* (2006.01)
*H04W 56/00* (2009.01)
*H04W 76/02* (2009.01)

(52) U.S. Cl.
CPC ...... *H04W 56/0015* (2013.01); *H04W 76/023* (2013.01)

(58) Field of Classification Search
CPC . H04W 56/001; H04W 72/04; H04W 74/006; H04W 78/025; H04W 16/28
USPC .................................. 370/350, 389
See application file for complete search history.

(56) References Cited

U.S. PATENT DOCUMENTS

| 2010/0322174 A1* | 12/2010 | Ji | H04W 74/006 370/329 |
| 2013/0132502 A1 | 5/2013 | Stacey et al. | |
| 2014/0065964 A1* | 3/2014 | Turunen | H04W 8/005 455/41.2 |

FOREIGN PATENT DOCUMENTS

WO WO 2013/106711 A1 7/2013

OTHER PUBLICATIONS

"WF on Triggering Condition for Transmiting D2DSS"; 3GPP TSG RAN WG1 #76; R1-140938; Prague, Czech Republic; Feb. 10-14, 2014; 2 pages.

* cited by examiner

*Primary Examiner* — Chi H Pham
*Assistant Examiner* — Alexander O Boakye

(57) ABSTRACT

Disclosed is a method for supporting synchronization of a user equipment (UE) for D2D communication. The method includes: first scanning for checking a synchronization signal transmitted from a nearby UE; establishing the UE as a synchronization-transmitting UE, based on a result of the first scanning; transmitting a synchronization channel including timer value information indicating scanning time at which a scanning starts; and second scanning based on the timer value information.

36 Claims, 25 Drawing Sheets

Success Case

Failure Case

METHOD AND APPARATUS FOR SUPPORTING SYNCHRONIZATION IN D2D COMMUNICATION

CROSS-REFERENCE TO RELATED APPLICATIONS AND CLAIM OF PRIORITY

The present application is related to and claims the benefit under 35 U.S.C. §119(a) to Korean Application Serial Nos. 10-2014-0033710 filed Mar. 21, 2014, 10-2014-0037206 filed Mar. 28, 2014, 10-2014-0055941 filed May 9, 2014, 10-2014-0101993 filed Aug. 7, 2014, and 10-2014-0153917 filed Nov. 6, 2014, in the Korean Intellectual Property Office, the entire content of which is hereby incorporated by reference.

TECHNICAL FIELD

The present disclosure relates to a method and an apparatus for supporting synchronization in device-to-device communication (D2D communication). In addition, the present disclosure relates to a structure of a transmission resource that is used by user devices in D2D communication as well.

BACKGROUND

Recently, data traffic has sharply increased due to the spread of smart phones. According to Korea Broadcasting and Communication Commission, it was reported that the data traffic had increased three times in 2013, compared to the preceding year. Considering that the number of smart phone users will increase more, and application services using the smart phones will be provided more as well, mobile data traffic is expected to increase at a faster rate than it increases now. Particularly, when the machine-to-machine (M2M) communication, which is a new mobile communication market beyond communications between users, in which communication is made between a user and a machine, or between machines, is widely used, the data traffic to be transmitted to base stations will increase too much to be controlled.

Therefore, technologies to solve the problem above are required, and recently, communication between devices has been noticed as one of the technologies. The technology called device-to-device (D2D) communication has been noticed in the field of a licensed band that is used in cellular mobile communication, and an unlicensed band that is used in communication such as a wireless LAN.

The D2D communication may be fused with the cellular mobile communication in order to give beneficial effects by which a traffic accommodation capacity of a base station can be enhanced, and overload can be reduced. That is, user equipments (UE) in the same cell or in the adjacent cells establish a D2D communication link between them and exchange data through the D2D communication link without passing through the base station {or an evolved NodeB (eNB)}, so two links (that is, one link from one UE to the eNB, and the other link from the eNB to the other UE) may be decreased to a single link (that is, the link from one UE to the other UE).

Research for the unlicensed band is aimed at recognizing demand for communication between users, communication between a user and a machine, and communication between machines to prevent a waste of wireless resources and at adequately determining the traffic that is locally generated to thereby provide services. Accordingly, the research is focused on a method for effectively operating the process in which a plurality of devices broadcasts and receives information on the service or the content.

In order to perform D2D communication, devices are required to be synchronized with each other. The device establishes synchronization between devices using time information received through a synchronous base station or a global positioning system (GPS) receiving module. In the method by which the synchronization is made using the time information received through a synchronous base station or a GPS receiving module, the device is required to connect with the synchronous base station or the GPS receiving module.

In some cases, a communication provider may not provide the synchronous base station, depending on the communication type supported by the communication provider. In this case, it is not likely to make synchronization using the time information received from the synchronous base station. In addition, if the device is located in a shadow area of the GPS (e.g., between high-rise buildings, in tunnels, in buildings, or the like), the device may not receive the time information to thereby fail to make synchronization. Consequently, when a connection with the synchronous base station or the GPS receiving module is not stable, the device cannot initiate the D2D communication.

SUMMARY

To address the above-discussed deficiencies, it is a primary object to provide a method and an apparatus for supporting synchronization between user equipments (UE) for D2D communication. In addition, the present disclosure provides a frame structure of a resource that supports a cluster extension method and an inter-cluster synchronization method. In addition, the present disclosure provides a method for determining or changing the role of a UE in the synchronization, that is, an establishing method of a synchronization-transmitting UE and an associating method with a synchronization-transmitting UE, considering the mobility of the UE.

In accordance with an aspect of the present disclosure, a method for supporting synchronization of a user equipment (UE) for D2D communication, the method comprising: first scanning for checking a synchronization signal transmitted from a nearby UE; establishing the UE as a synchronization-transmitting UE, based on a result of the first scanning; transmitting a synchronization channel including timer value information indicating scanning time at which a scanning starts; and second scanning based on the timer value information.

In accordance with another aspect of the present disclosure, a method for supporting synchronization of a user equipment (UE) for D2D communication, the method comprising: first scanning for checking a synchronization signal transmitted from a nearby UE; associating the UE as a synchronization-receiving UE, based on a result of the first scanning; receiving at least one synchronization channel including timer value information indicating scanning time at which a scanning starts; and second scanning based on the timer value information.

In accordance with another aspect of the present disclosure, a transmitting user equipment (UE) for supporting synchronization for D2D communication, the UE comprising: a controller configured to first scan for checking a synchronization signal transmitted from a nearby UE, to establish the UE as a synchronization-transmitting UE, based on a result of first scanning, to transmit a synchronization channel including timer value information indicating scanning time at which a scanning starts, and to second scan based on the timer value information.

In accordance with another aspect of the present disclosure, a receiving user equipment (UE) for supporting synchronization for D2D communication, the UE comprising: a controller configured to first scan for checking a synchronization signal transmitted from a nearby UE, to associate the UE as a synchronization-receiving UE, based on the scanning result, to receive at least one synchronization channel including timer value information indicating scanning time at which a scanning starts, and to second scan based on the timer value information.

The present disclosure can provide effective synchronization for D2D networks, and can support both a cluster extension synchronization method and an inter-cluster synchronization method to thereby attain low power consumption and a high synchronization performance.

In addition, the present disclosure can be effectively adapted to a dynamic network with mobility by applying time-based scanning to thereby enhance the synchronization performance.

Before undertaking the DETAILED DESCRIPTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION

Figure 1:
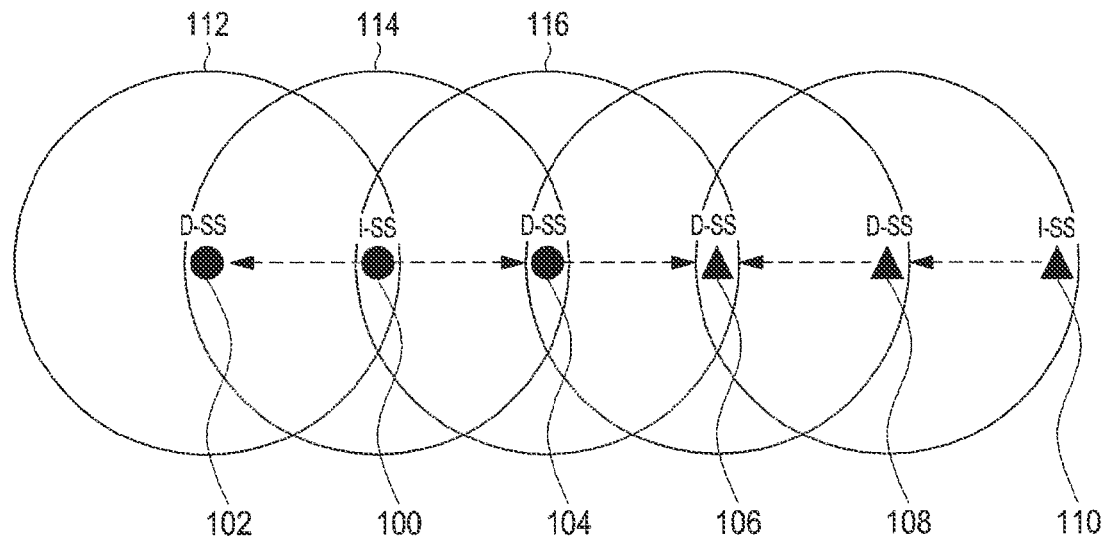
FIG. 1 is a conceptual diagram illustrating a cluster extension method according to an embodiment of the present disclosure.

FIGS. 1 through 28, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged wireless communications device.

In the detailed description of the present disclosure, an example of interpretable meanings of some terms used in the present disclosure is proposed. However, it is noted that the terms are not limited to the examples of the construable meanings which are proposed below.

A base station is an entity that communicates with a user equipment (UE), and is also referred to as a BS, a base transceiver station (BTS), a Node B (NB), an eNode B (eNB), an access point (AP), or the like.

The user equipment is an entity that communicates with the base station, and also is referred to as a UE, a mobile station (MS), a mobile equipment (ME), a terminal, or the like.

The UEs for performing D2D communication can be divided into a synchronization-transmitting UE and a synchronization-receiving UE. The synchronization-transmitting UE (referred to as a synchronization source as well) transmits a D2D synchronization signal (D2DSS) or a D2D synchronization channel (D2DSCH), and encompasses a synchronization-reference UE, a synchronization-support UE, and a synchronization-relaying UE. In some cases, a "base station" for transmitting D2D synchronization signals is regarded as a "synchronization-transmitting UE."

The synchronization-receiving UE (referred to as a "D2DUE" as well) receives (but does not transmit) the synchronization signal or the synchronization channel. The synchronization signal refers to a signal including a synchronization sequence that is used for identifying the cluster or the synchronization-transmitting UE, and a synchronization signal resource refers to a resource that is used in transmitting the synchronization signal. The synchronization channel refers to a channel including synchronization-related messages or system-related messages, and a synchronization channel resource refers to a resource for transmitting the synchronization channel. The synchronization-transmitting UE transmits the synchronization signal or the synchronization channel. Hereinafter, for convenience of explanation, it should be noted that the synchronization signal will be described to encompass the synchronization signal and the synchronization channel unless otherwise stated.

The synchronization-reference UE {referred to as an independent synchronization source (I-SS), or a synchronization head (SH) as well} is another synchronization-transmitting UE that acts as a synchronization head for creating a cluster, and the synchronization-reference UE determines a timing independently unless it is located in a base station area.

The synchronization-support UE {referred to as a volunteering synchronization source (V-SS) as well} is another synchronization-transmitting UE to voluntarily help two or more different synchronization-reference UEs in making the synchronization of timing.

The synchronization-relaying UE {referred to as a dependent synchronization source (D-SS) as well} is another synchronization-transmitting UE that relays (e.g., receives and forwards) the synchronization signal or the synchronization channel from the synchronization-reference UE after making synchronization of timing with the synchronization-reference UE. For example, in the case where the synchronization-relaying UE relays the synchronization signal from the base station, the synchronization-relaying UE acts as the SH.

The cluster means a group of one or more UEs that are associated with a single SH in D2D communication. That is, the UE that is associated with a single cluster can be defined as a UE that receive the synchronization signal transmitted from the SH.

In order to make synchronization between the UEs (or between the D2D communication devices) in a state in which the base station has not been detected, the UE should receive the synchronization signal transmitted from another UE, and should synchronize the timing using the received synchronization signal. Therefore, the UE in a state in which the base station has not been detected needs to transmit the synchronization signal to nearby UEs (on behalf of the base station).

Transmission of synchronization signals by the UE may not be suitable for D2D broadcast communication in which a single UE should transmit the signals to all of nearby UEs within a communication area. Because the synchronization-receiving UE located on the edge of the cluster configured by a single synchronization-transmitting UE, is likely to receive the synchronization signal from another synchronization-transmitting UE that belongs to another nearby cluster. At this time, the reference time given by the synchronization signal from the cluster with which the synchronization-receiving UE is associated can be different from the reference time given by the synchronization signal from another nearby cluster. In this environment, in order to receive a plurality of synchronization signals that have different reference time (or timing), the UE should repeat to determine the reference time and receive the control channel to thereby check whether or not the UE that transmits a signal to be received exists. This operation may impose a burden on the UE, and in the case of a multitude of nearby UEs, the overall system performance may deteriorate due to the load of the synchronization process.

Accordingly, in order to secure the maximum synchronized area with nearby UEs, the UE can use two methods as follows.

One is a cluster extension method by which the cluster is enlarged through the relay of the synchronization signal. However, the cluster extension method is limited to the number of relay hops. Thus, even with the enlargement of the cluster, the cluster must have its boundary, and other clusters having a different reference time must exist at the boundary thereof.

FIG. 1 is a conceptual diagram illustrating a cluster extension method according to an embodiment of the present disclosure.

The initial cluster of the synchronization-reference UE 100 is denoted by a circle indicated by a reference numeral 114. With the help of the synchronization-relaying UEs 102 and 104 that relay the synchronization signal of the synchronization-reference UE 100, the cluster of the synchronization-reference UE is enlarged to include circles denoted by reference numerals 112 and 116. Likewise, the cluster of the synchronization-reference UE 110 is enlarged through the operation of the synchronization-relaying UEs 108 and 106.

However, the cluster has a boundary due to the limitation of the number of relay hops in the cluster extension method, and the synchronization-relaying UE 106 located at the boundary of the cluster of the synchronization-reference UE 110 receives the synchronization signal from another synchronization-transmitting UE 104 of the nearby cluster 116. The synchronization signal from the synchronization-transmitting UE 104 is different from the synchronization signal from the synchronization-transmitting UE 108 in the reference time, so there can be a difference between the clusters.

The other is an inter-cluster synchronization (ICS) method for making the reference time be the same between the nearby clusters.

Figure 2:
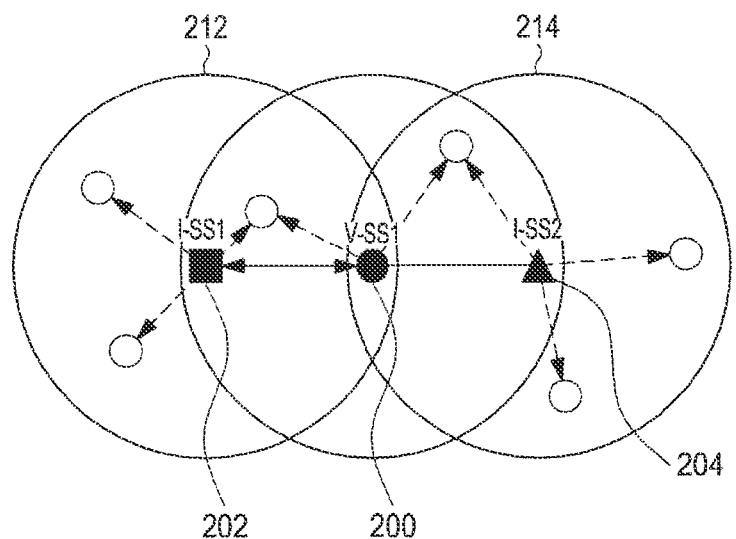
FIG. 2 is a conceptual diagram illustrating an inter-cluster synchronization method according to an embodiment of the present disclosure.

FIG. 2 is a conceptual diagram illustrating the inter-cluster synchronization (ICS) method according to an embodiment of the present disclosure.

In the ICS method, the synchronization-support UE (V-SS) 200 transmits the synchronization signal between a plurality of synchronization-reference UEs (I-SS1) 202 and (I-SS2) 204, which represent the clusters 212 and 214, respectively, to thereby help the plurality of the nearby I-SSs 202 and 204, and the V-SS 200 in converging on a common reference time. According to the ICS method, the boundary of the cluster can be removed to thereby bring about better performance, but it takes time for the convergence.

Accordingly, the present disclosure provides frame structure of a transmission resource, a selection method of the synchronization-transmitting UE, and an association method with the synchronization-transmitting UE, which are necessary for operating the cluster extension method and the inter-cluster synchronization method together.

D2D standardization work, which is expected as a Long Term Evolution (LTE) Release 12 (R12) work item (WI), has decided a method by which a D2D UE performs scanning for a predetermined period, and if an existing synchronization-reference UE is detected (or discovered) during the scanning period, the D2D UE is to be associated in the synchronization-reference UE. Otherwise, the D2D UE is to play the role of a new synchronization-reference UE. In addition, a method in which a certain D2D UE relays the synchronization signal for the UEs outside the cluster has been suggested. Therefore, the selection of the synchronization-reference UE or the association with the synchronization-reference UE needs to be defined as a concrete environment or condition.

Figure 3:
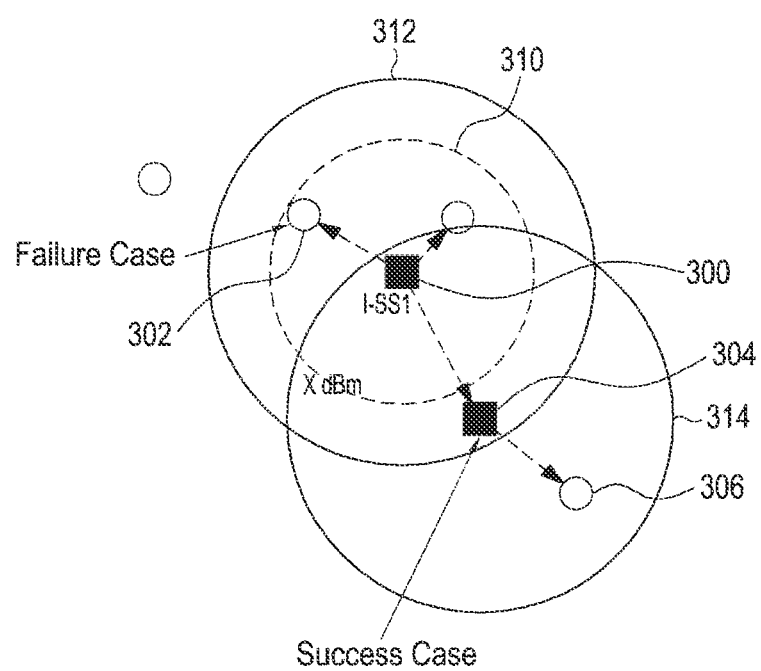
FIG. 3 illustrates an example in which a synchronization-relaying UE succeeds in relaying a synchronization signal and fails to relay the same in a cluster extension method according to an embodiment of the present disclosure.

FIG. 3 illustrates an example in which the synchronization-relaying UE succeeds in relaying the synchronization signal and fails to relay the same in the cluster extension method according to an embodiment of the present disclosure.

A criterion by which the synchronization signal from the synchronization-reference UE 300 is relayed can be a synchronization signal power received by the UE. For example, if the received synchronization signal power is equal to or less than a predetermined critical value, the UE can be determined as the synchronization-relaying UE. This is for preventing the waste of transmission power and excessive interference signals due to a multitude of synchronization-transmitting UEs in the cluster.

In FIG. 3, the UEs 302 and 304 belong to the cluster 312 of the synchronization-reference UE 300. A small circle 310 shown as a dotted line in the cluster 312 of the synchronization-reference UE 300 refers to locations where the synchronization signal power received from the synchronization-reference UE 300 is "X" dBm. At this time, the UE 302 inside the small circle 310 has a received synchronization signal power more than the critical value ("X" dBm), so it cannot operate as the synchronization-relaying UE (that is, it fails to relay the signal). In contrast, the UE 304 outside the small circle 310 has a received synchronization signal power less than the critical value ("X" dBm), so it can operate as the synchronization-relaying UE (that is, it succeeds in relaying the signal). As a result, the cluster of the synchronization-reference UE 300 is extended to include the area of a circle 314, so the UE 306 located outside the initial cluster 312 can receive the synchronization signal. That is, the external UE of the cluster may or may not receive the synchronization signal depending on a circumstance or a condition in which the UE relays the synchronization signal.

Figure 4A:
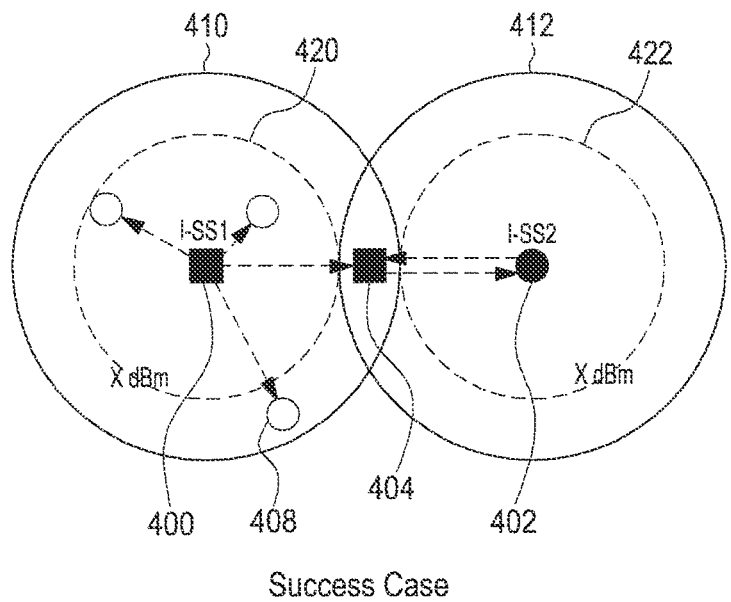
FIGS. 4A and 4B illustrate an example in which a synchronization-relaying UE succeeds in relaying a synchronization signal and or fails to relay the same in an inter-cluster synchronization method according to an embodiment of the present disclosure.
Figure 4B:
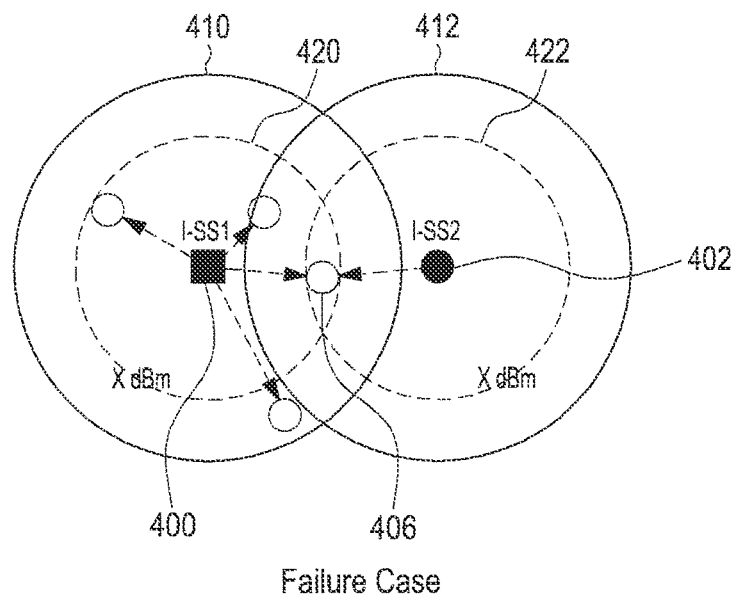

FIGS. 4A and 4B illustrate an example in which the synchronization-relaying UE succeeds in relaying the synchronization signal and fails to relay the same in the inter-cluster synchronization method according to an embodiment of the present disclosure.

A criterion for the synchronization-support UE that forwards the synchronization signal between two or more synchronization-reference UEs to make the convergence of the reference time can be the synchronization signal power received from the synchronization-reference UEs. For example, if all of the synchronization signal power values received from two or more synchronization-reference UEs are equal to or less than a predetermined critical value, the UE can be determined to operate as the synchronization-relaying UE. This is for preventing a waste of transmission power and excessive interference signals due to a multitude of synchronization-transmitting UEs in the cluster.

In FIG. 4(a), the UEs 404 and 408 belong to the cluster 410 of the synchronization-reference UE 400. Unlike the UE 408, the UE 404 is likely to be selected as the synchronization-support UE, because it belongs to the cluster of the synchronization-reference UE 400, and at the same time, it is located within the communication-available distance (or the coverage) of the synchronization-reference UE 402.

A small circles 420 and 422 shown as a dotted line refers to locations where the synchronization signal power received from the synchronization-reference UEs 400 and 402 is "X" dBm. The UE 404 outside the small circles 420 and 422 has a received synchronization signal power value less than the critical value ("X" dBm), so it can operate as the synchronization-relaying UE (that is, it succeeds in relaying the signal). As a result, the reference time of the synchronization-reference UEs 400 and 402 may converge on a common value. In the present disclosure, the area inside the large circle means a synchronization signal reception area where the synchronization signal is successfully received. In addition, it means that a synchronization signal more than a specific power value can be received.

In FIG. 4(b), the UE 406 belongs to the cluster 410 of the synchronization-reference UE 400. The UE 406 is likely to be selected as the synchronization-support UE, because it belongs to the cluster of the synchronization-reference UE 400, and at the same time, it is located within the communication-available distance (or the coverage) of the synchronization-reference UE 402.

However, since the UE 406 is located in the small circles 420 and 422, a synchronization signal power value received from the synchronization-reference UE 400 and 402 is more than the critical value ("X" dBm), so it cannot operate as the synchronization-support UE (that is, it fails).

Figure 5:
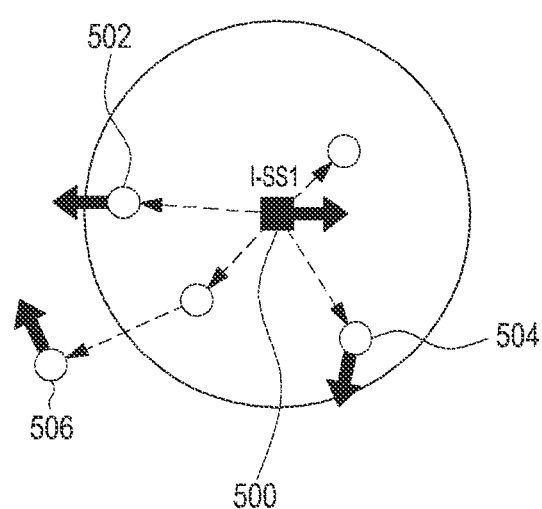
FIG. 5 illustrates an example showing the mobility of UEs in a cluster.
Figure 6A:
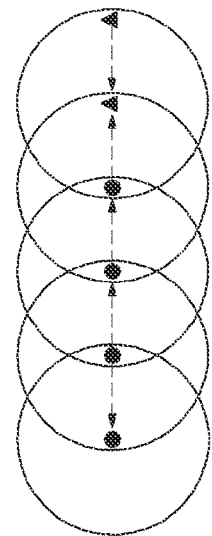
FIGS. 6A, 6B, 6C, 6D, 6E, 6F, 6G, 6H and 6I illustrate an example showing a change in the cluster structure according to the mobility of UEs in a cluster extension method.
Figure 6D:
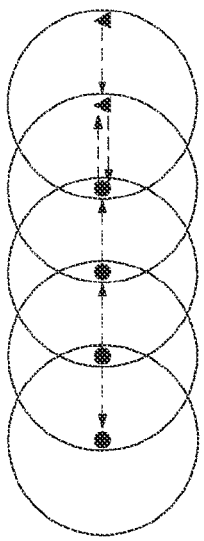
Figure 6G:
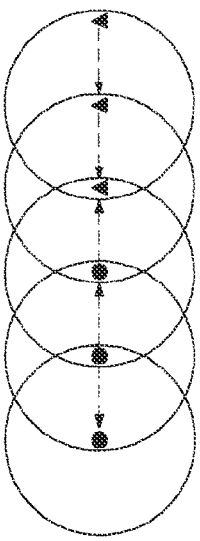
Figure 6B:
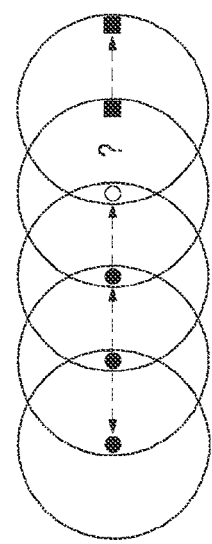
Figure 6E:
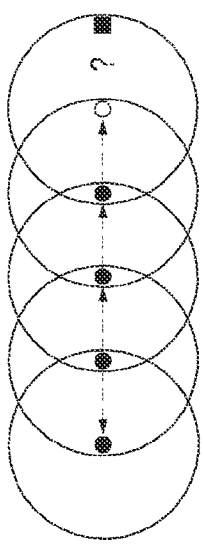
Figure 6H:
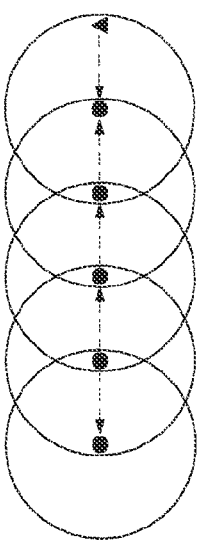
Figure 6C:
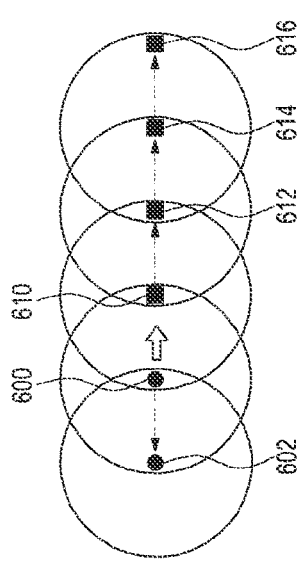
Figure 6F:
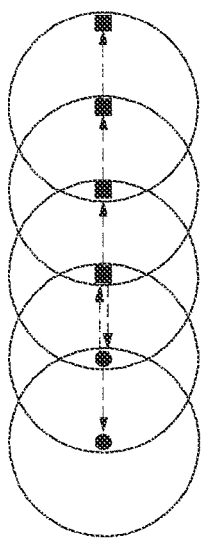
Figure 6I:
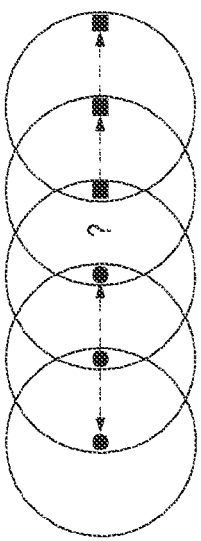

FIG. 5 illustrates the mobility of UEs in a cluster.

FIG. 5 shows that the UE 506 outside the cluster as well as the synchronization-reference UE 500, and the synchronization-receiving UEs 502 and 504 in the cluster, may move.

That is, the D2D environment assumes a network in which the UEs dynamically move, so the election and the retirement of the synchronization head, and the association of the UE with the synchronization head should be determined in consideration of the mobility of the UEs. Particularly, in the cluster extension method, the cluster structure is frequently changed due to the mobility of the UEs.

Particularly, in the cluster extension method, the cluster structure is frequently changed due to the mobility of the UEs.

FIGS. 6A-6I is an example illustrating a change in the cluster structure according to the mobility of UEs in a cluster extension method.

FIGS. 6A-6I show that when the first cluster (where the UEs of black circles are associated) is extended, and accordingly, the synchronization-reference UE of the second cluster (where the UEs of black squares are associated) belongs to the first cluster, the UEs associated with the second cluster lose the reference time, and then some of them are to be associated with the first cluster and others are to create a new cluster, i.e., the third cluster (where the UEs of black triangles are associated). For convenience of explanation, it should be noted that the reference numerals denoting the UEs are to be applied in the same manner in sub-diagrams (a) to (i). Sub-diagrams (a) to (i) correspond to steps 1 to 9, respectively, which will be described below.

In step 1 of sub-diagram (a), the UEs 600 and 610 are the synchronization-reference UEs. The synchronization-relaying UE 602 relays the synchronization signal from the synchronization-reference UE 600. The synchronization-relaying UEs 612, 614 and 616 relay the synchronization signal from synchronization-reference UE 610. That is, the UEs 600 and 602 constitute the first cluster, and the UEs 610, 612, 614 and 616 constitute the second cluster.

In step 2 of sub-diagram (b), the UE 610 detects the nearby synchronization-reference UE 600. The UE 610 determines whether the UE 610 is to retire from the synchronization-reference UE and is to operate as the synchronization-relaying UE according to a predetermined condition.

In step 3 of sub-diagram (c), as a result of the determination in step 2, the UE 610 retires from the synchronization-reference UE, and is associated with the cluster (the first cluster) of the synchronization-reference UE 600 to operate as the synchronization-relaying UE. In addition, the UE 612 that has become a new synchronization-reference UE due to the retirement of the UE 610, detects the nearby synchronization-transmitting UE 610, and determines whether the UE 612 is to retire from the synchronization-reference UE and is to operate as the synchronization-relaying UE according to a predetermined condition.

In step 4 of sub-diagram (d), as a result of the determination in step 3, the UE 612 retires from the synchronization-reference UE, and is associated with the cluster (the first cluster) of the synchronization-reference UE 600 to operate as the synchronization-relaying UE. In addition, the UE 614 that has become a new synchronization-reference UE due to the retirement of the UE 612, detects the nearby synchronization-transmitting UE 612, and determines whether the UE 614 is to retire from the synchronization-reference UE and is to operate as the synchronization-relaying UE according to a predetermined condition.

In step 5 of sub-diagram (e), as a result of the determination in step 4, the UE 614 retires from the synchronization-reference UE, and is associated with the cluster (the first cluster) of the synchronization-reference UE 600 to operate as the synchronization-relaying UE. In addition, the remaining UE 616 in the existing cluster (the second cluster) after the retirement of the UE 614, determines whether the UE 616 is to operate as the synchronization-reference UE representing a new cluster (the third cluster).

In step 6 of sub-diagram (f), as a result of the determination in step 5, the UE 616 is the synchronization-reference UE representing the new cluster (the third cluster). Meanwhile, since the cluster extension method is limited to the number of relay hops from the synchronization-reference UE, the additional extension of the first cluster may not be made. In addition, the UE 614 that operates as the synchronization-relaying UE at the location of three hops from the synchronization-reference UE 600 detects the nearby synchronization-reference UE 616, and determines whether the UE 616 is to dissociate itself from the first cluster and is to operate as the synchronization-relaying UE of the synchronization-reference UE 616 according to a predetermined condition. The UE 614 prefers being associated with the nearby synchronization-reference UE 616 to being associated with the remote synchronization-reference UE 600.

In step 7 of sub-diagram (g), as a result of the determination in step 6, the UE 614 dissociates itself from the first cluster and associates itself with the cluster (the third cluster) of the synchronization-reference UE 616 to operate as the synchronization-relaying UE.

In step 8 of sub-diagram (h), the synchronization-relaying UE 612 detects the nearby synchronization-reference UE 614, and determines whether or not the UE 612 dissociates itself from the first cluster and operates as the synchronization-relaying UE of the synchronization-reference UE 616 according to a predetermined condition.

In step 9 of sub-diagram (i), as a result of the determination in step 8, the UE 612 dissociates itself from the first cluster and associates itself with the cluster (the third cluster) of the synchronization-reference UE 616 to operate as the synchronization-relaying UE.

In consideration of the mobility of UEs, a method for effectively supporting the synchronization between D2D UEs, which can support the cluster extension method and the inter-cluster synchronization method, is required. To this end, the present disclosure provides a timer-based scanning method and a method for determining the role of the UE according to the result of the scanning. In addition, the present disclosure provides a process of operating as the synchronization-transmitting UE and a process of association as the synchronization-receiving UE. The D2D synchronization-support method of the present disclosure, for example, can be applied to Ad-hoc networks, sensor networks, vehicle networks, D2D networks, or the like.

As describe above, when the base station has not yet been detected, the UE needs to transmit the synchronization signal on behalf of the base station. If all of the UEs operate as the synchronization-transmitting UE for transmitting the synchronization signal, the power consumption can be excessive, or the reception performance of the synchronization signal may be lowered (due to interference). Therefore, in the present disclosure, it is assumed that some of the UEs operate as the synchronization-transmitting UE according to a predetermined condition.

Figure 7:
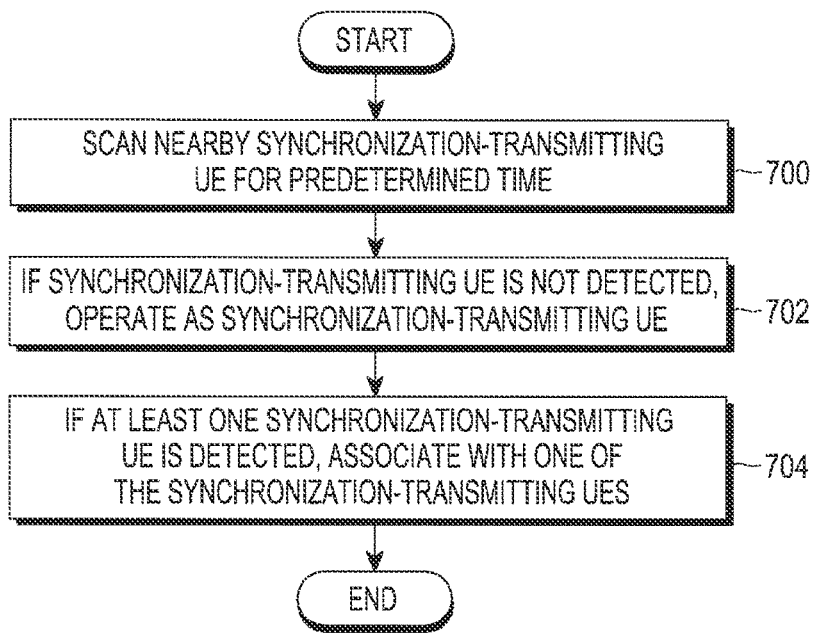
FIG. 7 illustrates an example showing the process of determining a synchronization-transmitting UE and associating a synchronization-receiving UE according to an embodiment of the present disclosure.

FIG. 7 is an example illustrating a process of determining the synchronization-transmitting UE and associating the synchronization-receiving UE according to an embodiment of the present disclosure.

A condition and a process of determining the synchronization-transmitting UE and associating the synchronization-receiving UE will be described below.

The UE performs scanning in order to check the presence of the synchronization-transmitting UE for a predetermined period of time (700).

As a result of the scanning in operation 700, if no nearby synchronization-transmitting UE is detected, the UE operates as the synchronization-transmitting UE (702).

As a result of the scanning in operation 700, if at least one of the nearby synchronization-transmitting UEs is detected, the UE is associated with one of the detected synchronization-transmitting UEs (704).

Figure 8:
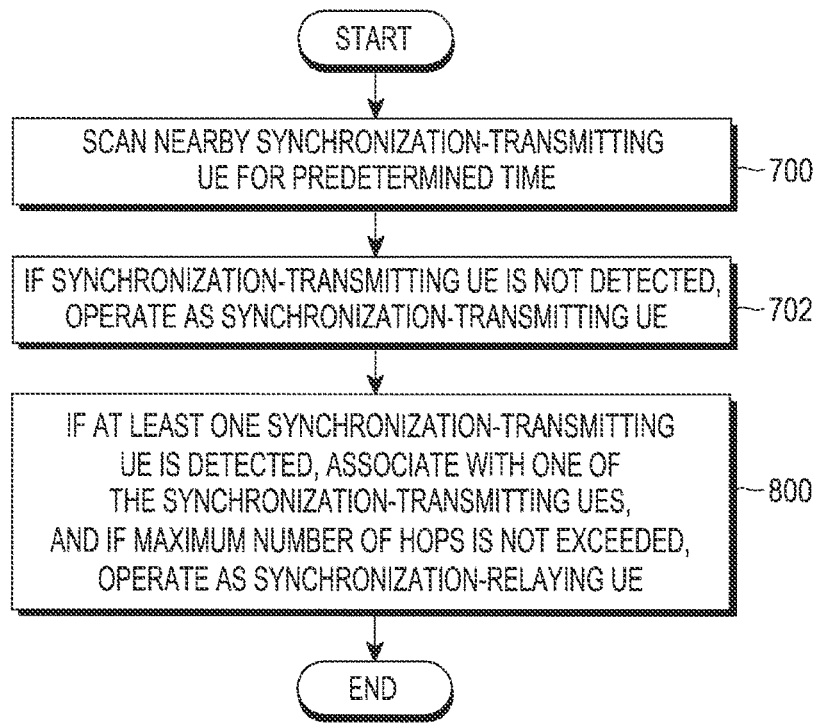
FIG. 8 illustrates an example showing the process of determining a synchronization-transmitting UE and associating a synchronization-receiving UE according to another embodiment of the present disclosure.

The cluster extension method can be modified as shown in FIG. 8, based on the process of FIG. 7.

FIG. 8 is an example illustrating a process of determining the synchronization-transmitting UE and associating the synchronization-receiving UE according to another embodiment of the present disclosure.

The UE performs scanning in order to identify the presence of the synchronization-transmitting UE for a predetermined period of time (700).

As a result of the scanning in operation 700, if no nearby synchronization-transmitting UE is detected, the UE operates as the synchronization-transmitting UE (702).

As a result of the scanning in operation 700, if at least one of the nearby synchronization-transmitting UEs is detected, the UE is associated with one of the detected synchronization-transmitting UEs, and if the relay hops thereof do not exceed the maximum number of hops, the UE operates as the synchronization-relaying UE (800).

Figure 9:
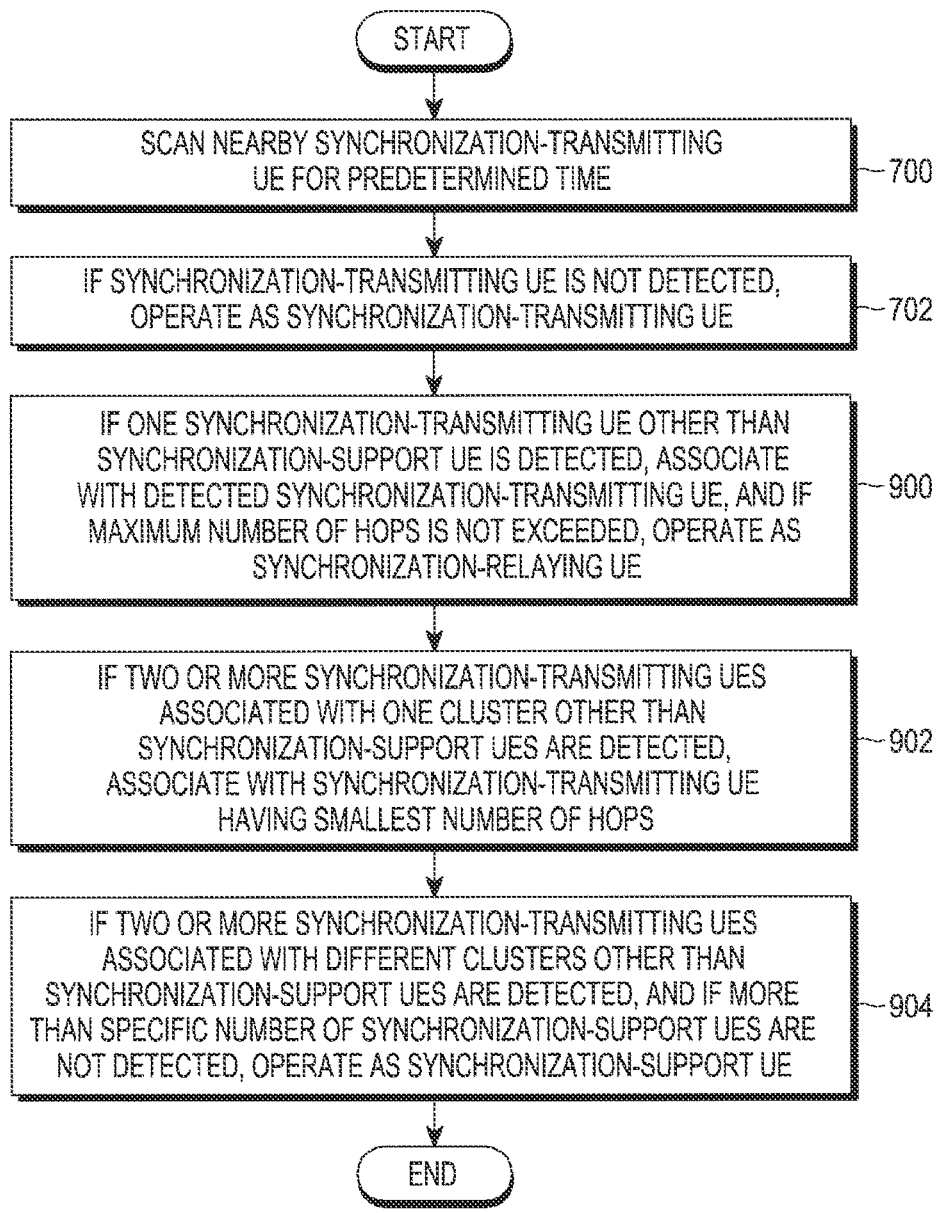
FIG. 9 illustrates an example showing the process of determining a synchronization-transmitting UE and association of a synchronization-receiving UE according to another embodiment of the present disclosure.

The inter-cluster synchronization method can be modified as shown in FIG. 9, based on the process of FIG. 7.

FIG. 9 is an example illustrating a process of determining the synchronization-transmitting UE and associating the synchronization-receiving UE according to another embodiment of the present disclosure.

The UE performs scanning in order to identify the presence of the synchronization-transmitting UE for a predetermined period of time (700).

As a result of the scanning in operation 700, if no nearby synchronization-transmitting UE is detected, the UE operates as the synchronization-transmitting UE (702).

As a result of the scanning in operation 700, if a single of synchronization-transmitting UE (i.e., the synchronization-reference UE, or the synchronization-relaying UE) other than the synchronization-support UE is detected, the UE is associated with the detected synchronization-transmitting UE, and if the hops thereof do not exceed the maximum number of hops, the UE operates as the synchronization-relaying UE (900).

As a result of the scanning in operation 700, if a plurality of synchronization-transmitting UEs (i.e., the synchronization-reference UEs, or the synchronization-relaying UEs), which are associated with one cluster, other than the synchronization-support UE is detected, the UE is associated with the synchronization-transmitting UE having a minimum number of hops among the detected synchronization-transmitting UEs, and if the hops thereof do not exceed the maximum number of hops, the UE operates as the synchronization-relaying UE (902).

As a result of the scanning in operation 700, if one or more synchronization-transmitting UEs, which are associated with different clusters, respectively, other than the synchronization-support UE are detected, and if no synchronization-support UE is detected, the UE operates as the synchronization-support UE (904). Alternatively, only if more than a specific number of synchronization-support UEs are not detected (that is, only if the number of synchronization-support UEs detected is less than a predetermined value), the UE operates as the synchronization-support UE.

Furthermore, the UE operates as the synchronization-transmitting UE according to two criteria as follows. The first can be the number of the synchronization-transmitting UEs (i.e., the presence of the synchronization signals, or the number thereof), or the type of synchronization-transmitting UE, which are detected through the scanning by the UE (shown in FIGS. 7 to 9). The second includes at least one of a value of a timer that is internally driven in order to determine the time when the UE determines its own role, the quality of a received synchronization signal, the number of relay hops of the synchronization signal, or the type of synchronization signal.

It is preferable that the synchronization signal is transmitted by the UE (hereinafter, referred to as a "synchronization-transmitting UE") that is to transmit searching signals, communication control signals, communication data signals, or the like, in order to prevent the UE from receiving the synchronization signal from the synchronization-transmitting UE that does not have communication signals with for the UE. In addition, the system is prevented from creating unnecessary synchronization-transmitting UEs to thereby reduce the reception complexity of the system.

The first condition and the second condition are not exclusive to each other, and can be combined together. That is, if a combination of the conditions is satisfied, the UE can be determined to operate as the synchronization-transmitting UE.

A method for controlling a certain UE to transmit the synchronization signal includes various embodiments. For example, the UE that is to transmit a searching signal can receive a request for searching from an upper layer to thereby transmit the synchronization signal. For another example, the UE that is to transmit a data signal can receive a request for transmitting data from an upper layer to thereby transmit the synchronization signal. For another example, the UE that is controlled to transmit a specific communication control signal by the base station can transmit the synchronization signal. For another example, the UE that receives a specific communication control signal from another UE is driven to transmit a communication control signal in response to the control signal, wherein the UE can transmit the synchronization signal.

Figure 10:
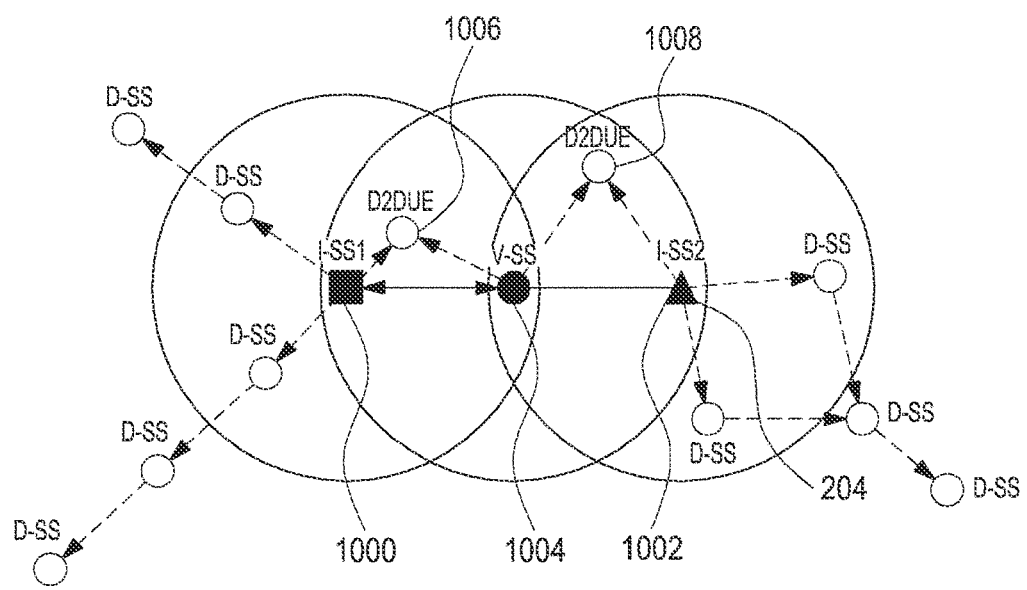
FIG. 10 illustrates an example of a cluster that is configured through the process of determining a synchronization-transmitting UE according to an embodiment of the present disclosure.

FIG. 10 is an example of a cluster that is configured through the synchronization-transmitting UE determination process according to an embodiment of the present disclosure.

The UE 1004 that has performed the scanning detects two nearby synchronization-reference UEs 1000 and 1004, and can operate as the synchronization-support UE. However, if any one of the synchronization-reference UE 1000 and 1004 does not support the inter-cluster synchronization (ICS), the UE 1004 does not operate as the synchronization-support UE but as the synchronization-receiving UE. Information on whether or not the synchronization-reference UE supports the ICS can be included in the synchronization channel to be transmitted by the synchronization-reference UE.

The UEs (e.g., UEs 1006 and 1008) that do not satisfy the condition by which the UE can operate as the synchronization-transmitting UE operates as the synchronization-receiving UE, and is associated with a certain synchronization-transmitting UE. The synchronization-receiving UE 1006 among the UEs associated with the synchronization-transmitting UE 1000 receives the synchronization signal from the synchronization-reference UE 1000, or receives the synchronization signal from the synchronization-support UE 1004. In addition, the synchronization-receiving UE 1008 among the UEs associated with the synchronization-transmitting UE 1002 receives the synchronization signal from the synchronization-reference UE 1002, or receives the synchronization signal from the synchronization-support UE 1004.

The D2D network comprised of the synchronization-transmitting UEs and the synchronization-receiving UEs can be easily changed in its configuration by the mobility of the UEs. Unlike the typical method by which the synchronization-transmitting UE is frequently changed in its role, the present disclosure provides a method for performing scanning to determine or change the role thereof, based on a timer.

The timer is triggered in the synchronization-reference UE when the synchronization-reference UE is created. In addition, the timer is configured to be a specific value when the UE begins to act as the synchronization-reference UE (or when it operates, or when it is reset), and the value decreases as time passes to the minimum value, e.g., "0", at which the timer is determined to terminate. Although the start time of the timers of the synchronization-reference UEs located in the network can be different from each other, it is assumed that the initial setup value thereof may be the same. The synchronization-relaying UE can conform to the timer value of its own associated synchronization-reference UE. The synchronization-support UE can use the timer value when a low power condition is required, but otherwise (when a low power condition is not required) the synchronization-support UE may not use the timer value.

When the timer ends, the UE triggers the scanning operation as described above.

The synchronization-transmitting UE includes information for informing of scanning time (i.e., start time at which the scanning starts) corresponding to the timer value in the synchronization signal or the synchronization channel to be thereby transmitted periodically or irregularly while maintaining the timer value. The information for informing of the scanning time can be expressed as information, such as the scanning time, time-to-scan, a synchronization signal detecting period, synchronization-reference age, synchronization-reference expiring time, a silent period, or the like as well as timer value information.

The timer value information is received by the nearby synchronization-receiving UE or the synchronization-transmitting UE. For example, when the timer value information is changed, the synchronization-transmitting UE transmits the timer value information to the nearby UEs. In order to be prepared for dynamic circumstances, the synchronization-transmitting UE periodically transmits the timer value information.

The synchronization-receiving UE having received the timer value information triggers the scanning operation according to a change in the timer value information of the synchronization-transmitting UE with which the synchronization-receiving UE is associated. For example, when the timer value information stating that the timer value of its own associated synchronization-transmitting UE has reached the minimum value is received, the synchronization-receiving UE triggers the scanning operation. According to the operation above, the synchronization-transmitting UE and the synchronization-receiving UE simultaneously performs the scanning in the same period, or performs the scanning in sequence approximately at the same time. If all of the UEs in the cluster perform the scanning simultaneously in the same period, or in sequence approximately at the same time, interference between the UEs may be eliminated, and the UE can quickly recognize the change of the role of the synchronization-transmitting UE to thereby re-establish its role. Consequently, the communication error due to a synchronization fault between UEs can be minimized. Certainly, the synchronization-transmitting UE should transmit the synchronization signal according to the reference time for the purpose of re-synchronization in the scanning period.

The synchronization-receiving UE compares the timer value information of its own synchronization-transmitting UE with the timer value information of the nearby synchronization-transmitting UE with which the synchronization-receiving UE is not associated to thereby operate.

For example, if the timer value of the non-associated synchronization-transmitting UE is greater than the timer value of its own associated synchronization-transmitting UE (in the case where the non-associated synchronization-transmitting UE just started to operate as the synchronization-transmitting UE), the synchronization-receiving UE switches its association from the current synchronization-transmitting UE to the non-associated synchronization-transmitting UE, or performs the scanning.

For another example, if the timer value of the non-associated synchronization-transmitting UE is less than the timer value of its own associated synchronization-transmitting UE (in the case where the non-associated synchronization-transmitting UE has operated as the synchronization-transmitting UE for a long time), the synchronization-receiving UE switches its association from the current synchronization-transmitting UE to the non-associated synchronization-transmitting UE, or performs the scanning.

For another example, the synchronization-receiving UE switches its association from the current synchronization-transmitting UE to the non-associated synchronization-transmitting UE, or performs the scanning, according to whether or not the timer value of the non-associated synchronization-transmitting UE satisfies a predetermined condition.

For another example, when the timer value of the non-associated synchronization-transmitting UE is received, priority can be manually adjusted. More specifically, if the non-associated synchronization-transmitting UE is the UE that receives the synchronization signal from the base station and that is located in the network area, the synchronization-transmitting UE that has been recently created (that is, a young UE) can be given the priority, whereas if the UE is located outside the network area, the synchronization-transmitting UE that was created a long time before can be given the priority.

For another example, a criterion by which timer values of the plurality of synchronization-transmitting UEs are compared with each other can be properly controlled in terms of the mobility of the UE and the maintenance of the cluster. More specifically, in comparing the timer values of the plurality of synchronization-transmitting UEs, an intermediate value (between a start value and an end value) can be given the highest priority, and the youngest value or the oldest value can be given the lowest priority. Giving the highest priority to the intermediate timer value may eliminate the problem in which the size of the cluster cannot be increased by associating the UEs with only the recently created cluster, and the problem in which the UEs are associated with quite old cluster.

For another example, the young value is given a high priority in the relationship between the synchronization-reference UE and the synchronization-receiving UE. The old value is given a high priority in the relationship between the synchronization-reference UE and the synchronization-support UE. Alternatively, the old value can be given a high priority in the relationship between the synchronization-reference UE and the synchronization-receiving UE, and the young value can be given a high priority in the relationship between the synchronization-reference UE and the synchronization-support UE.

Meanwhile, the terms "young" and "old" denotes "close to" and "far from" the timer start value, respectively. Accordingly, the "young" value can correspond to a "large value" or a "small value" according to a "descending count type" or an "ascending count type" of the timer, respectively.

For another example, when the timer value of the non-associated synchronization-transmitting UE is received, the UE can refrain itself from transmitting its own signal during the scanning period of the non-associated synchronization-transmitting UE. In order to prevent excessive suppression of the signal transmission, the UE suppresses the signal transmission only when the non-associated synchronization-transmitting UE has a high priority (e.g., higher than the UE). The priority information is determined based on a synchronization-transmitting UE ID included in the synchronization signal or the synchronization channel, a priority value included in the synchronization channel, a system frame number (SFN), a timer value for informing of the scanning period, or the like.

The operation of the scanning or the change of association of the synchronization-receiving UE is performed by further considering at least one of the quality of the received synchronization signal, the number of relay hops of the synchronization signal, or the type of synchronization signal.

The operation of the synchronization-reference UE in relation to the timer is similar to that of the synchronization-relaying UE. However, a difference exists in that the synchronization-reference UE may set the timer value by itself, whereas the synchronization-relaying UE may set the timer value, based on the timer value information of the synchronization-reference UE with which the synchronization-relaying UE is associated. As known from the description above, the synchronization-relaying UE can play the role of the synchronization-receiving UE with respect to the synchronization-reference UE, and can play the role of the synchronization-transmitting UE with respect to the synchronization-receiving UE.

The synchronization-support UE performs the same operation as that of the synchronization-relaying UE, or transmits the synchronization signal without relaying the timer value, according to the network configuration. For example, when the hierarchical synchronization (e.g., the synchronization in which an ID of the synchronization-reference UE, a competitive value of the synchronization-reference UE, and an intent value, or the recently created synchronization-reference UE are given the priority) is supported, the synchronization-support UE performs the operation of relaying the timer value, and when the equal synchronization (e.g., the synchronization in which the priority is not given to an ID, a competitive value, and an intent value of the synchronization-reference UE, or the creation time) is supported, the synchronization-support UE may not relay the timer value (but can transmit the reference time information for the synchronization).

The synchronization-reference UE receives the synchronization signal and the synchronization channel of other synchronization-transmitting UEs to obtain the timer value, and can change its own role, based on the obtained timer value. For example, the synchronization-reference UE can compare the timer value information received from another nearby synchronization-transmitting UE with its own timer value. If its own timer value is less than the timer value of another synchronization-transmitting UE {that is, if the nearby synchronization-transmitting UE is created (or operated) later than the synchronization-reference UE}, the synchronization-reference UE is determined to stop operating as the synchronization-reference UE, and to be associated with the nearby synchronization-transmitting UE or to perform the scanning. Selectively, the synchronization-reference UE is determined to be associated with the nearby synchronization-transmitting UE provided that the relay hops thereof do not exceed the maximum number of relay hops.

When the synchronization-reference UE identifies the synchronization-transmitting UE that has been created later than the synchronization-reference UE, the synchronization-reference UE changes its own timer value to the minimum value, and informs the synchronization-relaying UE or the synchronization-receiving UEs, which are associated with the synchronization-reference UE, of the changed timer value through the synchronization signal or the synchronization channel. Selectively, the synchronization-reference UE directly changes the timer value to the minimum value, or changes a reduction rate (that is, increase a reduction rate) of the timer value so that the timer terminates earlier.

Figure 11:
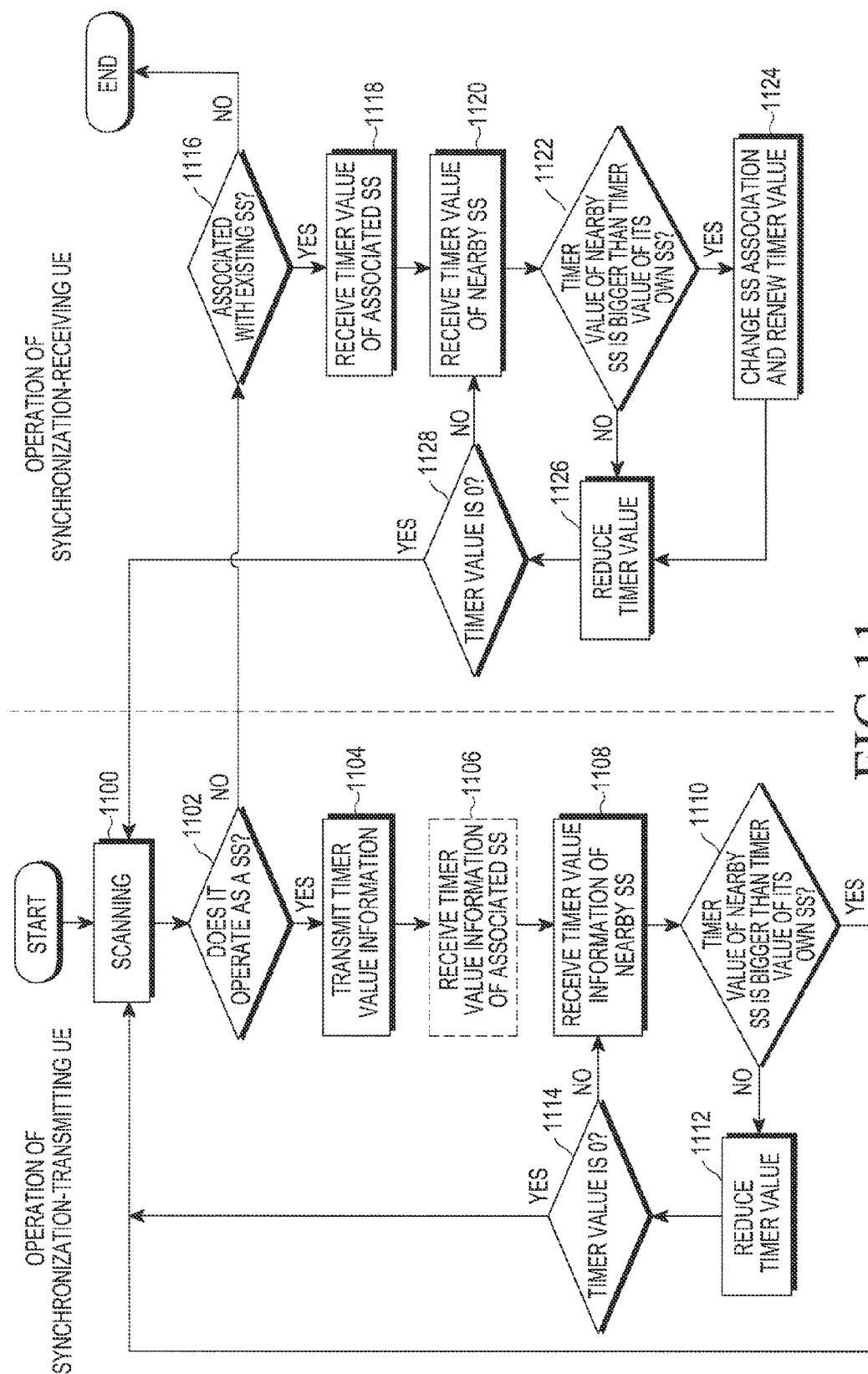
FIG. 11 illustrates an example of the operation related to a timer of a synchronization-transmitting UE and a synchronization-receiving UE according to an embodiment of the present disclosure.

FIG. 11 is an example illustrating the operation related to a timer of a synchronization-transmitting UE and a synchronization-receiving UE according to an embodiment of the present disclosure.

A certain UE operates as the synchronization-transmitting UE or the synchronization-receiving UE according to the result of the scanning, so the operation of the synchronization-transmitting UE and the synchronization-receiving UE will be described together with reference to a single drawing here. In FIG. 11, the operation of the synchronization-transmitting UE and synchronization-receiving UE is shown in the left and right, respectively.

The UE performs scanning in order to identify the synchronization signal from the nearby UEs for a predetermined period of time (1100).

Using the result of the scanning operation 1100, it is determined whether or not the UE operates as the synchronization-transmitting UE (i.e., SS; synchronization source) depending on whether at least one criterion is satisfied (1102). For example, as a result of the scanning, if no nearby synchronization-transmitting UE is detected, the UE can be selected as the synchronization-transmitting UE.

As a result of the determination in operation 1102, when the UE is selected as the synchronization-transmitting UE, the UE transmits the timer value information through the synchronization signal or the synchronization channel (1104).

The timer value information includes at least one of a current timer value of the timer that is triggered by the SH, a timer termination indicator, and a timer reduction rate. The timer value can be expressed as a multiple of a predetermined unit time (e.g., the system frame number or the D2D frame number), or can be a quantization value of the timer value. The unit time can be, for example, a sample interval, a transmission time interval (TTI), a subframe interval, frame interval, a paging interval, or the like. The quantization value can be expressed as, for example, "0" before the termination of the timer value, and "1" at the time of termination, respectively. Selectively, the timer value can be expressed as a value showing a ratio of the whole time to the elapsed time, wherein the timer value may be "0" (: young) from the start of the timer to the time corresponding to 30% of the whole time, and may be "1" (: old) from the time corresponding to 70% of the whole time to the termination of the timer. At this time, the whole time refers to a period from the timer start value to the timer end value (the minimum value). Alternatively, with regard to the timer value, a start (0/3) time, a 1/3 time, a 2/3 time, and a termination (3/3) time of the whole time can be expressed as binary numerals, such as "00 (baby)," "01 (: children)," "10 (: juvenile)," and "11 (: adult)," respectively.

The timer value can refer to the time left to the scanning time (i.e., the remaining number of frames). The timer value can indicate a specific time of a certain period of time (i.e., a specific frame number corresponding to the scanning time among the whole frames). For example, in the LTE system, the system frame number can denote numbers from zero to 1023. In this case, in order to inform of the scanning time, i.e., time of "600" when the current system frame number is time of "500," a relative difference of the timer value, i.e., "100," or an absolute value, i.e., "600" can be communicated.

The timer value can show the creating time or the valid period of the synchronization-transmitting UE. In the case where the timer value is used for comparing other UEs, the timer value is provided as a relative value through the synchronization channel.

When the scanning time is informed of by using an absolute value, the D2D system frame number is provided on behalf of the timer value through the synchronization channel. The UE that has received the synchronization channel can calculate the time left to the scanning time, based on the system frame number and the absolute scanning time value.

For another example, in order to inform of a plurality of periodic scanning periods during the valid period of a single of the synchronization-transmitting UE, information on division of the whole time can be additionally provided through the synchronization channel. Each of the plurality of the periodic scanning periods is configured to be greater than a single synchronization period. However, a long scanning period can influence other D2D operations, so it is preferable to configure the plurality of the periodic scanning periods to be less than the synchronization period.

For example, if one synchronization period is 40 ms, the scanning period is configured four times during the valid period of the synchronization-transmitting UE. Each of the scanning periods is given 10 ms. The offset can be configured to be different so that the scanning times do not overlap with each other in each scanning period.

Various modifications in addition to the embodiments above can be applied to the present disclosure.

Selectively, the UE receives the timer value information of the synchronization-transmitting UE with which the UE is associated (1106). The UE renews its own timer value using the received timer value information. However, this operation may be omitted in the case of the synchronization-reference UE because there is no synchronization-transmitting UE with which the UE is associated. Likewise, the timer value information may not be received in the case of the synchronization-support UE.

The UE receives the timer value information from the nearby synchronization-transmitting UE (1108). Here, the nearby synchronization-transmitting UE means a UE with which the UE is not associated.

The UE compares the timer value of the nearby synchronization-transmitting UE with the timer value of its own synchronization-transmitting UE using the received timer value information (1110).

As a result of the determination in operation 1110, if the timer value of the nearby synchronization-transmitting UE is greater than the timer value of the associated synchronization-transmitting UE (that is, when the nearby synchronization-transmitting UE was created later than its own synchronization-transmitting UE), the UE can switch its association from the current synchronization-transmitting UE to the nearby synchronization-transmitting UE, or can return to operation 1100 to thereby perform the scanning. The operation of changing its own association of the UE is performed by further considering at least one of the quality of the received synchronization signal, the number of relay hops of the synchronization signal, or the type of synchronization signal. Selectively, in the case of changing its own association, the UE further performs an operation of configuring the timer value as the end value (e.g., "0") so that the synchronization-receiving UEs that have received the synchronization signal transmitted by the UE can promptly perform the scanning for recognizing the change of the association of the UE.

As a result of the determination in operation 1110, if the timer value of the nearby synchronization-transmitting UE is not greater than the timer value of the associated synchronization-transmitting UE, the UE decreases the timer value by a reduction unit (e.g., decrease it by 1) (1112), and determines whether or not the current timer value is the end value (the minimum value, e.g., "0") (1114).

As a result of the determination in operation 1114, if current timer value is the end value, the UE returns to operation 1100 to thereby perform the scanning.

As a result of the determination in operation 1114, if the current timer value is not the end value, the UE proceeds to operation 1108 to thereby wait for the timer value information to be received from the nearby synchronization-transmitting UE.

Meanwhile, as a result of the determination in operation 1102, if the UE is not selected as the synchronization-transmitting UE, the UE operates as the synchronization-receiving UE as described below.

The UE determines whether or not the UE is to be associated with the existing synchronization-transmitting UE (that is, whether the UE operates as the synchronization-receiving UE) (1116). Selectively, the UE determines that it is to be associated with a certain synchronization-transmitting UE as a synchronization-receiving UE when the quality of the synchronization signal received from the nearby UE is equal to or more than (or exceeds) a critical value. This is because in the case where the quality of the received synchronization signal does not satisfy a reference value, even though the UE is associated with the nearby UE, the effective synchronization signal cannot be received.

As a result of the determination in operation 1116, if the UE is determined not to be associated with the existing synchronization-transmitting UE, the UE terminates without further operation. For example, when the UE does not support the D2D communication, the UE can terminate as described above. Meanwhile, in order to keep performing the D2D communication, the UE may return to operation 1100 to thereby resume the operation of scanning.

As a result of the determination in operation 1116, if the UE is determined to be associated with the existing synchronization-transmitting UE, the UE receives the timer value of its own associated synchronization-transmitting UE (1118). The UE can renew its own timer value using the received timer value information.

The UE receives the timer value information from the nearby synchronization-transmitting UE (1120). Here, the nearby synchronization-transmitting UE means the UE with which the UE is not associated.

The UE may compare the timer value of the nearby synchronization-transmitting UE with the timer value of its own associated synchronization-transmitting UE using the received timer value information (1122).

As a result of the determination in operation 1122, if the timer value of the nearby synchronization-transmitting UE is greater than the timer value of the associated synchronization-transmitting UE (that is, when the nearby synchronization-transmitting UE was created later than its own synchronization-transmitting UE), the UE switches its association from the current synchronization-transmitting UE to the nearby synchronization-transmitting UE, and renews its own timer value as the timer value of the new synchronization-transmitting UE (1124) to thereby reduces the timer value (1126). The operation of changing its own association of the UE is performed by further considering at least one of the quality of the received synchronization signal, the number of relay hops of the synchronization signal, or the type of synchronization signal.

When the UE is associated with the new synchronization-transmitting UE, the UE conforms to the reference time of the synchronization signal, and system configuration information included in the synchronization channel, which are transmitted by the new synchronization-transmitting UE. The system configuration information includes parameters such as the location of a search resource, the location of a control resource, the location of a data resource, cyclic prefix configuration, the location of a synchronization resource, a condition for the synchronization-transmitting UE, a timing advance value, or the like. The location of a specific resource is communicated by using a resource period, a time-based start point and a resource length, a bitmap for showing the presence of a resource, a frequency-based start point and a resource length, the number of resources, or the like.

As a result of the determination in operation 1122, if the timer value of the nearby synchronization-transmitting UE is not greater than the timer value of the associated synchronization-transmitting UE, the UE reduces the timer value (1126), and determines whether or not the current timer value is the end value (the minimum value, e.g., "0") (1128).

As a result of the determination in operation 1128, if the current timer value is not the end value, the UE proceeds to operation 1120 to thereby wait for the timer value information to be received from the nearby synchronization-transmitting UE.

As a result of the determination in operation 1128, if the current timer value is the end value, the UE returns to operation 1100 to thereby perform the scanning.

Alternatively, the comparison of operation 1110 and operation 1122 can be made according to another criterion. That is, when the timer value of the nearby synchronization-transmitting UE is less than the timer value of the associated synchronization-transmitting UE, the scanning (1100) or the change of the association (1124) is performed. More specifically, if the nearby synchronization-transmitting UE is the UE that receives the synchronization signal from the base station and that is located in the network area, the synchronization-transmitting UE that has been recently created (that is, a young UE) is given the priority, whereas if the UE is located outside the network area, the synchronization-transmitting UE that was created a long time before is given the priority.

The scanning is performed by some of or all of the UEs in the scanning period.

For example, the scanning is performed by all of the UEs that satisfy a predetermined comparison condition. The UEs that satisfy a predetermined comparison condition can be the UEs for which the reception power or the quality of the signal transmitted by the base station or the synchronization-transmitting UE has been measured to be lower than a reference reception power.

For another example, the scanning is performed by the UE that has received the synchronization signal or the synchronization channel from the synchronization-transmitting UE other than the associated base station or the associated synchronization-transmitting UE of the previous scanning. When the scanning is performed by some of the UEs, the scanning result is to be shared with other UEs. That is, the UE that has recognized a non-synchronization state after the scanning informs the associated base station or the associated synchronization-transmitting UE of the non-synchronization state. The base station or the synchronization-transmitting UE that has received information on the non-synchronization state from the UE informs other associated UEs of the non-synchronization state of the UE, transmits a re-synchronization instruction, or adjusts the timer value.

The UE that has recognized a synchronization state after the scanning informs the associated base station or the associated synchronization-transmitting UE of the synchronization state, or may not inform of the same.

For another example, all of the UEs can become the synchronization-transmitting UEs. In this case, the synchronization between the UEs is carried out in the same manner as the synchronization between the synchronization-reference UE and the synchronization-support UE. That is, each UE is not associated with another synchronization-transmitting UE, and adjusts its own synchronization-reference time according to a specific condition. In this case, the UE exchanges the timer values in order to have the same scanning time.

For example, the UE can receive the synchronization channel to thereby identify the timer value provided through the synchronization channel. The UE that has identified the timer value determines whether or not the scanning time indicated by the timer value of the synchronization channel is to be applied, based on the comparison condition defined in any one of the embodiment set forth above.

When it is determined that the scanning time indicated by the timer value of the synchronization channel is to be applied, the UE renews the current timer value and/or the system frame number. For example, if the received timer value is a relative value, the UE renew the current timer value as the same value as the received timer value. If the received timer value is an absolute value, the UE renews the system frame number and the timer value, which are included in the synchronization channel, as the same value. If the scanning time is preliminarily fixed in the system frame number, the operation can be made by renewing only the system frame number. According to an embodiment of the present disclosure, several scanning times are determined in one period of the system frame number.

Figure 12:
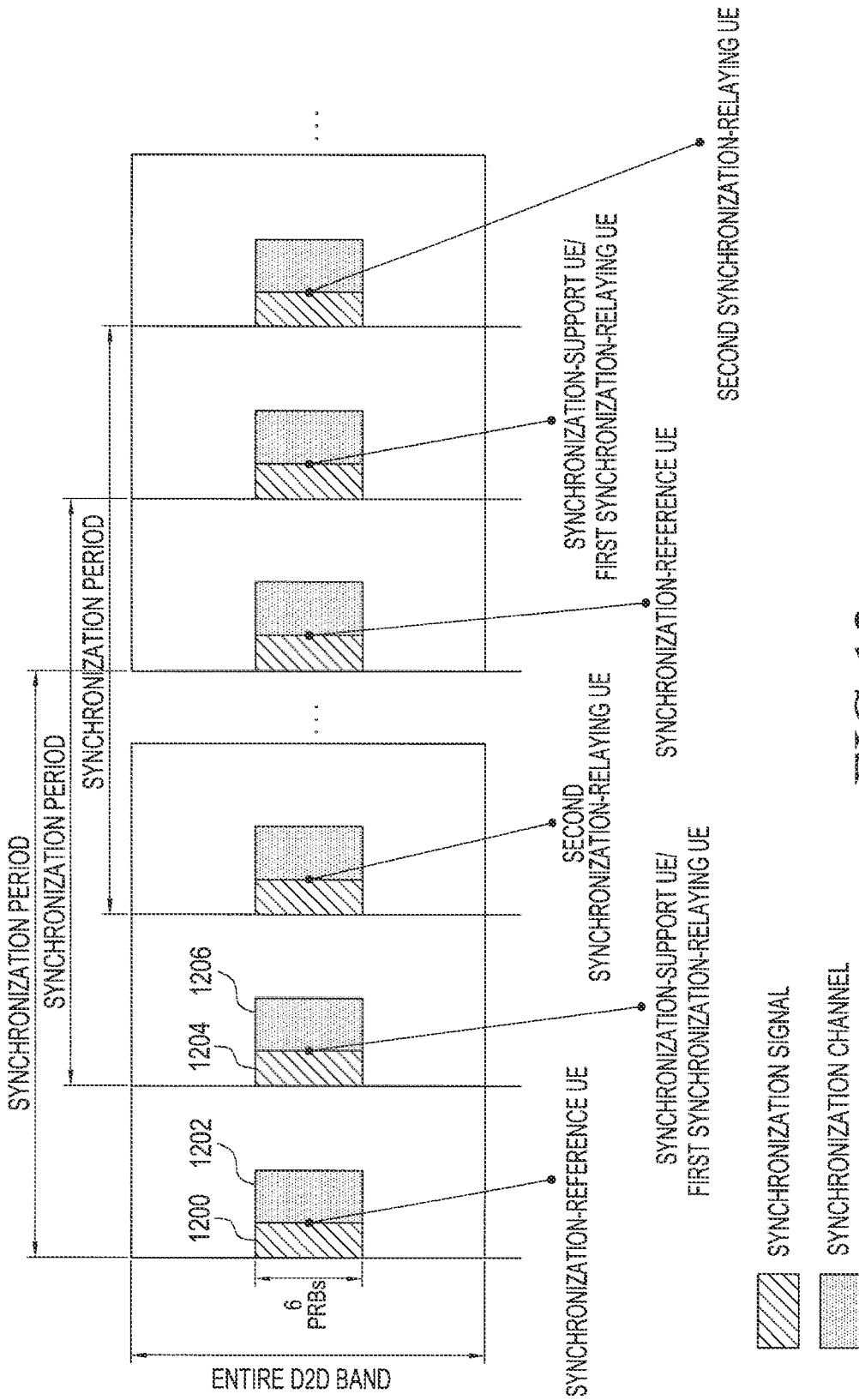
FIG. 12 illustrates an example of a frame structure showing a transmission resource that is used depending on the type of synchronization-transmitting UE according to an embodiment of the present disclosure.
Figure 13:
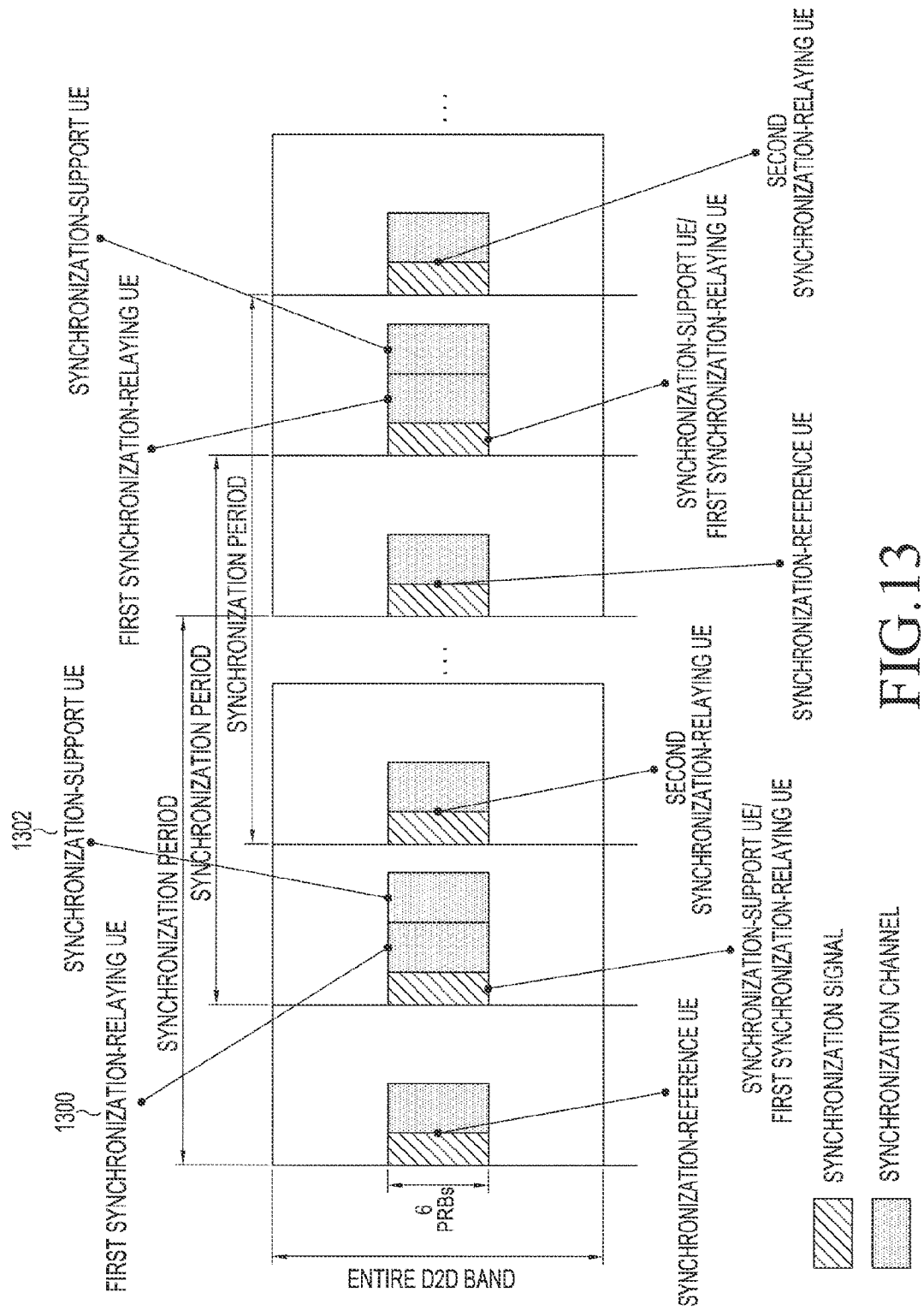
FIG. 13 illustrates an example of a frame structure showing a transmission resource that is used depending on the type of synchronization-transmitting UE according to another embodiment of the present disclosure.

A frame structure of a transmission resource used for the D2D synchronization will be described with reference to FIGS. 12 to 14. In FIGS. 12 to 14, the horizontal axis denotes a time axis, and the vertical axis denotes a frequency axis.

The frame structure of the resource includes a synchronization signal resource for transmitting a synchronization sequence, and a synchronization channel resource for transmitting synchronization-related messages and system-related messages. The synchronization-reference UE, the synchronization-support UE, and the synchronization-relaying UE transmit the synchronization signal and synchronization channel.

FIG. 12 is an example of a frame structure of a transmission resource that is used according to the type of synchronization-transmitting UE according to an embodiment of the present disclosure.

The synchronization signal and the synchronization channel can occupy six physical resource blocks (PRB) among the entire frequency band for D2D communication. For example, the synchronization signal and the synchronization channel of the synchronization-reference UE can be transmitted using six PRBs indicated by reference numerals 1200 and 1202.

Although the resource position in the frame structure may be different according to the type of synchronization-transmitting UE, the resources used by the synchronization-support UE and the first synchronization-relaying UE (that receives the synchronization signal of one hop, and transmits the synchronization signal of two hops) can be the same. That is, the synchronization-support UE and the first synchronization-relaying UE may use the same resource indicated by a reference numeral 1204. In spite of that, since the synchronization signal of the synchronization-support UE is different from the synchronization signal (a synchronization sequence) of the synchronization-relaying UE, the UE that receives the synchronization signal can recognize which synchronization-transmitting UE transmits the synchronization signal through the resource 1204 or 1206. It is assumed that the synchronization-relaying UE does not transmit the synchronization channel in order to avoid a conflict in FIG. 12. Therefore, the resource indicated by a reference numeral 1206 is to be used by the synchronization-relaying UE. A plurality of synchronization-relaying UEs associated with the same cluster may transmit the same data through the synchronization channel to thereby avoid a conflict.

FIG. 13 is an example of a frame structure of a transmission resource that is used according to the type of synchronization-transmitting UE according to another embodiment of the present disclosure.

FIG. 13 shows the case in which the synchronization-support UE is allotted with a separate resource to transmit the synchronization channel regardless of the synchronization-relaying UE.

The resource 1300 is used for the first synchronization-relaying UE, and the resource 1302 is used for the synchronization-support UE.

Figure 14A:
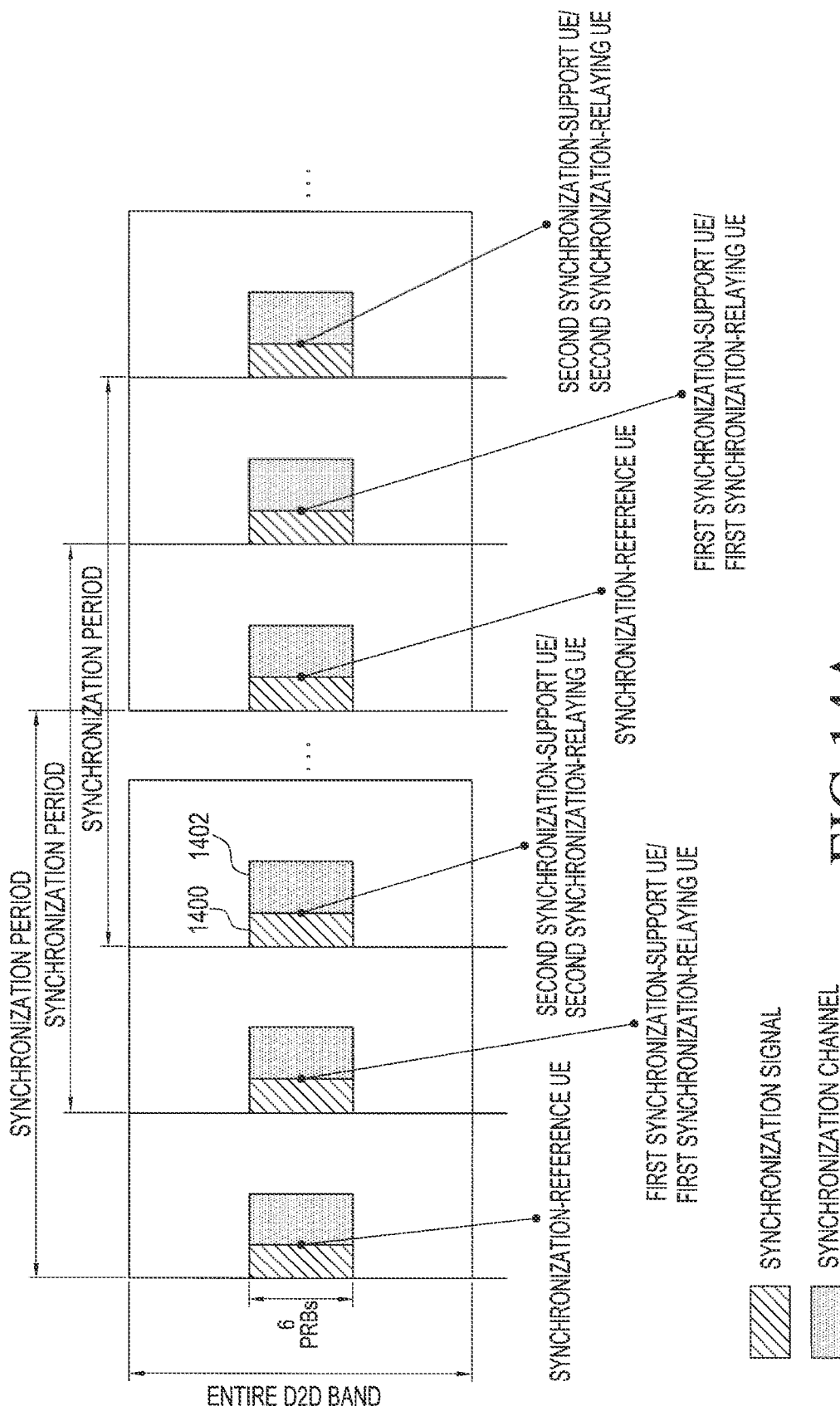
FIG. 14a illustrates an example of a frame structure showing a transmission resource that is used depending on the type of synchronization-transmitting UE according to another embodiment of the present disclosure.

FIG. 14a is an example of a frame structure of a transmission resource that is used according to the type of synchronization-transmitting UE according to another embodiment of the present disclosure.

Compared to FIG. 12, FIG. 14a shows that when the synchronization-support UE is added, the second synchronization-support UE and the second synchronization-relaying UE (i.e., of two hops) may share the same resource.

For example, the resource 1400 can be used as a transmission resource of the synchronization signal by the second synchronization-relaying UE, and the resource 1402 can be used as a transmission resource of the synchronization channel by the second synchronization-relaying UE.

For another example, the resource 1400 can be used as a transmission resource of the synchronization signal by the second synchronization-support UE, and the resource 1402 can be used as a transmission resource of the synchronization channel by the second synchronization-support UE.

Figure 14B:
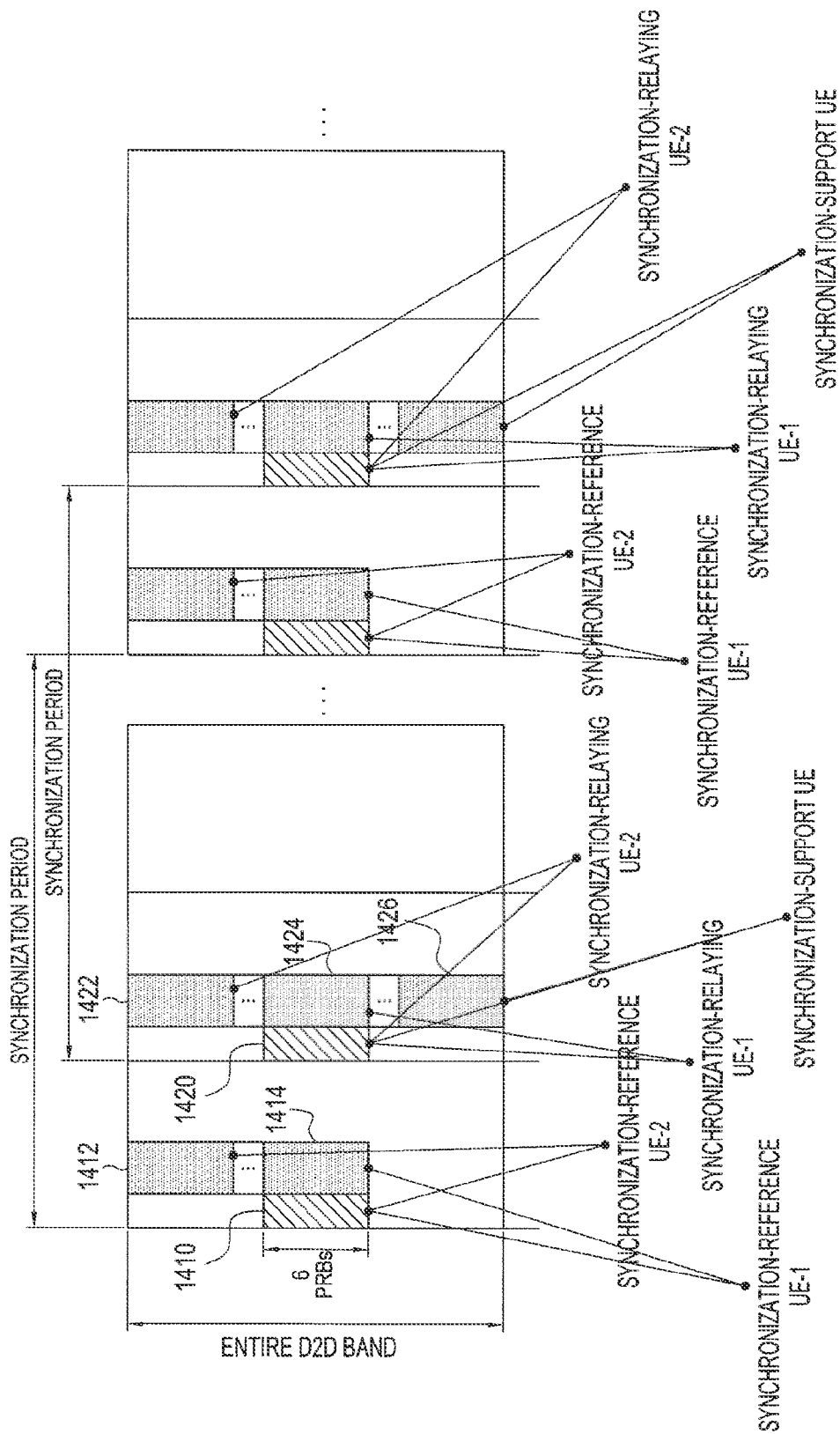
FIG. 14b illustrates an example of a frame structure showing a transmission resource that is used depending on the type of synchronization-transmitting UE according to another embodiment of the present disclosure.

FIG. 14b is an example of a frame structure of a transmission resource that is used according to the type of synchronization-transmitting UE according to another embodiment of the present disclosure.

In order to avoid a conflict between the synchronization channels, FIG. 14b shows a frame structure in which the synchronization-transmitting UEs of different clusters use the resources of different frequencies (that is, the resources separated on the frequency axis).

The resource position of the synchronization channel used by the synchronization-transmitting UEs of different clusters can be randomly selected, or can be obtained by applying modular calculation to the cluster ID. The resource position of the synchronization channel can be preliminarily determined to be separated.

More specifically, the synchronization signal resource 1410 for the synchronization-reference UE can be used by the synchronization-reference UE 1 and the synchronization-reference UE 2 in different clusters. At this time, the synchronization signals of the different synchronization-reference UEs can be separated by a synchronization sequence. In addition, the different synchronization channel resource 1414 and the synchronization channel resource 1412, which are separated on the frequency axis, can be used by the synchronization-reference UE 1 and the synchronization-reference UE 2 of different clusters, respectively.

The synchronization signal resource 1420 for the synchronization-transmitting UE of one hop can be used by the synchronization-relaying UE 1, the synchronization-relaying UE 2, and the synchronization-support UE, which belong to the different clusters. At this time, the synchronization signals of the different synchronization-transmitting UEs can be separated by a synchronization sequence. In addition, the different synchronization channel resource 1424, the synchronization channel resource 1422, and the synchronization channel resource 1426, which are separated on the frequency axis, can be used by the synchronization-relaying UE 1, the synchronization-relaying UE 2, and the synchronization-support UE of the different clusters, respectively. Selectively, unlike other synchronization channel resources, the resource position of the synchronization channel for the synchronization-support UE is preliminarily determined to be separated.

The D2D synchronization-support method provided by the present disclosure is applied to a partial network coverage environment in which some of the UEs are not able to detect the base station as well as to an out-of-network coverage environment in which all of the UEs are not able to detect the base station. In the partial network area, the base station transmits a timing to the UEs outside the network area, and the UE that has been synchronized with the timing transmitted from the base station is given the priority. To this end, the UE includes information showing the transmission of the timing from the base station in the synchronization channel to be thereby transmitted.

Figure 15:
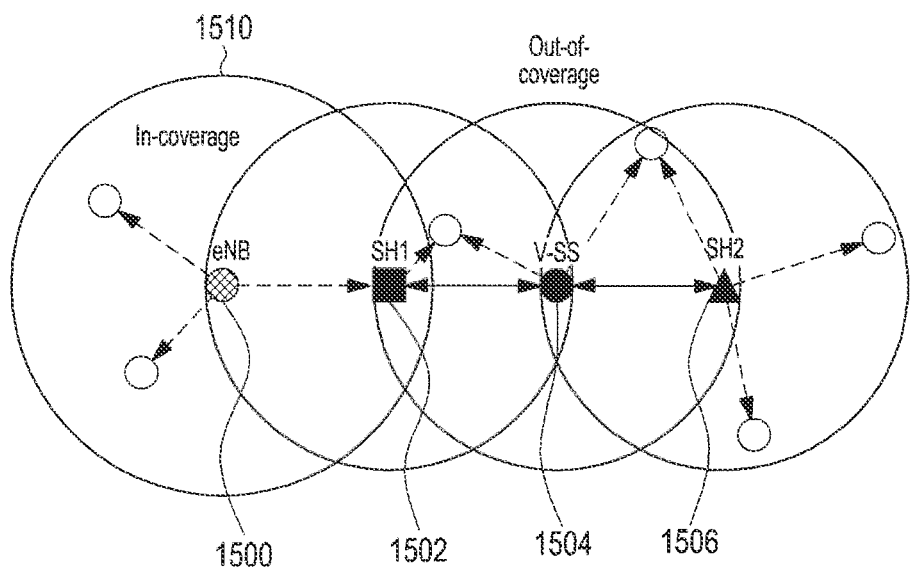
FIG. 15 illustrates an example of a partial network area environment where a synchronization-transmitting UE is located according to an embodiment of the present disclosure.

FIG. 15 is an example of a partial network area environment where a synchronization-transmitting UE is located according to an embodiment of the present disclosure.

A circle 1510 denotes an in-coverage area of an eNB 1500, and the area outside the circle 1510 means an out-of-coverage area.

The eNB 1500 transmits the synchronization signal through a downlink resource, whereas other D2D UEs (e.g., 1502, 1504, and 1506) transmit the synchronization signal through the uplink resource. At this time, the synchronization head 1 (SH1) 1502 can be regarded as a synchronization-relaying UE in terms of the eNB 1500, and can be regarded as a synchronization-reference UE in terms of the UEs in the our-of-coverage area. In addition, the SH1 1502 transmits the synchronization signal and synchronization channel in the uplink band using the synchronization resource allotted to the synchronization-reference UE, and (although it is a synchronization-relaying UE with respect to the eNB) may act as transmitting the synchronization signal for the first time without the relay of signals in terms of the UEs. Accordingly, the volunteering synchronization source (V-SS) 1504 may regard the SH1 1502 as a synchronization-reference UE upon the receipt of the synchronization signal and synchronization channel, and may determine the role as a synchronization-support UE with respect to the SH2 1506.

The SH1 1502 may perform scanning to thereby identify that there is no nearby SH UE, and becomes the SH UE itself. Alternatively, the SH1 1502 may send a SH UE request message to the eNB 1500, and may receive a SH UE response message from the eNB 1500 to thereby become the SH UE.

Figure 16:
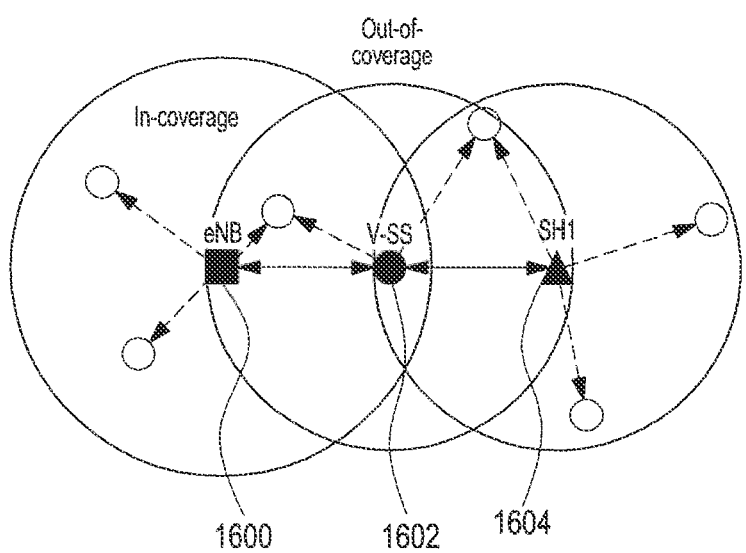
FIG. 16 illustrates an example of a partial network area environment where a synchronization-transmitting UE is located according to another embodiment of the present disclosure.

FIG. 16 is an example of a partial network area environment where a synchronization-transmitting UE is located according to another embodiment of the present disclosure.

The V-SS 1602 that conforms to the reference time of the eNB 1600 may operate as a synchronization-relaying UE with respect to the eNB 1600, and may operate as a synchronization-support UE with respect to the SH1 1602. At this time, the V-SS 1602 may transmit the synchronization signal and the synchronization channel in the uplink band using a synchronization resource allotted to the V-SS. The UEs (e.g., 1604) in the out-of-coverage area may recognize that the transmitter of the signal is the V-SS by means of the synchronization signal or the synchronization channel transmitted by the V-SS 1602. The V-SS 1602 may perform scanning to thereby identify that there is no nearby V-SS, and becomes the V-SS itself. Alternatively, the V-SS 1602 may send a V-SS request message to the eNB 1600, and may receive a SH response message from the eNB 1600 to thereby become the V-SS.

In the case of the eNBs provided in FIGS. 15 and 16, the eNBs 1500 and 1600 may determine the timer value information for the scanning of the UE in the network area. In addition, the UE in the network area may forward the timer value information received from the eNB according to the instruction of the eNB or voluntarily through the synchronization channel {D2D synchronization channel (D2DSCH)} or the D2D broadcast channel to other UEs.

Figure 17:
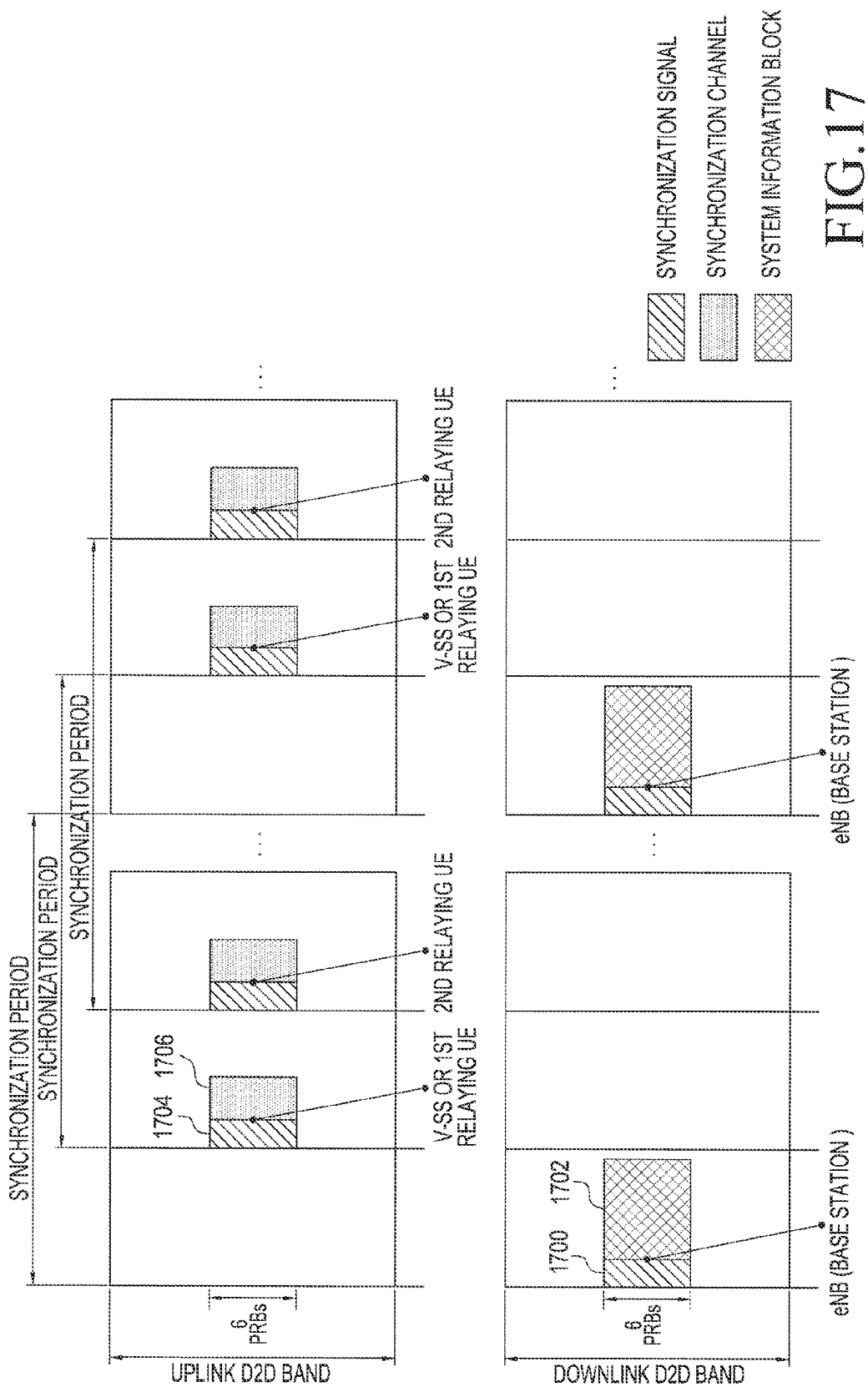
FIG. 17 illustrates an example of a frame structure showing a transmission resource that is used depending on a base station and a synchronization-transmitting UE according to another embodiment of the present disclosure.

FIG. 17 is an example of a frame structure of a transmission resource that is used according to a base station and a synchronization-transmitting UE according to another embodiment of the present disclosure.

FIG. 17 shows the frame structure of the resource used by the eNB and the D2D UEs in the partial network area environment as shown in FIG. 16.

Referring to FIGS. 16 and 17, the eNB 1600 may transmit the synchronization signal 1700 and a system information block (SIB) 1702 in the downlink band, and the V-SS 1602 may transmit the synchronization signal 1704 and the synchronization channel 1706 in the uplink band.

Meanwhile, in the synchronization of a reference time between nearby UEs through the D2D synchronization in the partial network area, the relationship with a nearby cell can be considered.

Basically, the synchronization of the eNBs of an LTE system does not match each other, so it is impossible to making a synchronization for signal transmission between UEs that each are associated with different cells. Therefore, the synchronization between the UEs in the partial network area environment is to be made between the UEs that have received a reference time relayed from the same eNB in the present disclosure. To this end, the UE may use only the synchronization signal defined by the eNB, or the synchronization channel received by the UE includes information showing an eNB ID. Even with the reference time transferred from the eNB, the hierarchical synchronization between the UE of the partial network area environment and the UE of the out-of-coverage area cannot be made due to the limitation of the number of hops.

To address that, the synchronization signal should be separated according to each cluster. For example, an ID of a single cell can be separated by a secondary synchronization signal (SSS) according to the LTE standard. In addition, according to the LTE standard, three sectors of a single cell can be separated using a primary synchronization signal (PSS).

According to an embodiment of the present disclosure, for D2D communication, one cluster can be recognized by the SSS, and the synchronization signals for the synchronization-reference UE, the synchronization-support UE, and the synchronization-relaying UE in one cluster can be separated up to three by the PSS. According to the LTE standard, the SSS can express 168 cell ID groups in total. Here, cell ID groups 0 to 166 are used for the cluster ID, and the remaining cell ID group 167 are allotted for the synchronization-support UE. The synchronization-support UE may select one of three PSSs in addition to the cell ID group 167 for operation. Additionally, the eNB that supports the Release 12 standard of LTE should not use the cell ID group 167 for implementation of the cell ID.

According to another embodiment of the present disclosure, some of the 168 cell ID groups separated by the SSS according to the LTE standard are allotted to the UEs in the network area, and the others are allotted to the UEs in the out-of-coverage area. With regard to the cell ID groups allotted to the UEs in the network area and the out-of-coverage area, the synchronization-reference UE, the synchronization-support UE, and the synchronization-relaying UE can be additionally separated by the PSS.

According to another embodiment of the present disclosure, some of the 504 cell ID groups separated by the PSS and the SSS according to the LTE standard are allotted to the UEs in the network area, and the others are allotted to the UEs in the out-of-coverage area. With regard to the cell ID groups allotted to the UEs in the network area and the out-of-coverage area, the synchronization-reference UE, the synchronization-support UE, and the synchronization-relaying UE can be additionally separated by the synchronization channel.

According to another embodiment of the present disclosure, one cluster expresses 504 cluster IDs by a combination of the PSS and the SSS, and includes information for separating the synchronization-reference UE, the synchronization-support UE, and the synchronization-relaying UE in the synchronization channel to be thereby transmitted. In this case, at least one of the 504 cluster IDs is allotted to the synchronization-support UE between the UEs in the out-of-coverage area.

Provided that the cluster and the synchronization-transmitting UE can be separated, as described above, if the synchronization-reference UE associated with the base station receives the synchronization signal only from the synchronization-support UE associated with the base station (that is, the synchronization-support UE using the same cluster ID), the synchronization-reference UE may perform synchronization between the clusters with respect to the corresponding synchronization signal. However, when the synchronization signal is received from the synchronization-support UE associated with another cluster, the synchronization-reference UE associated with the base station may not perform synchronization between the clusters with respect to the synchronization signal. In spite of that, the synchronization-reference UE that is not associated with the base station may perform synchronization between the clusters with respect to the synchronization signal from the synchronization-support UE in the out-of-coverage area.

When the synchronization signals are received from the synchronization-reference UEs in a plurality of clusters, the synchronization-support UE may check whether the synchronization-reference UEs transmitting a plurality of synchronization signals belong to the network area or the out-of-coverage area. If the synchronization signal is received from at least one of the UEs in the network area, the synchronization-support UE may transmit the synchronization signal for the synchronization-support UE with respect to a cluster ID of one of the synchronization signals from the UEs in the network area. If the synchronization signal is received from only the UE in the out-of-coverage area, the synchronization-support UE may select one of the cluster IDs for the UEs in the out-of-coverage area, and may transmit the synchronization signal for a synchronization-support UE with respect to the cluster ID.

In the case where the associated synchronization-relaying UE or the associated synchronization-receiving UE cannot receive the synchronization signal and the synchronization channel any more due to movement of the synchronization-reference UE, the synchronization-relaying UE or the synchronization-receiving UE may identify that it has lost the synchronization signal/synchronization channel after trying to find the signals for one or more synchronization periods, and may perform re-synchronization. In doing so, the synchronization-relaying UE or the synchronization-receiving UE may perform scanning, or (in the case of the synchronization-relaying UE) may change its role into the synchronization-reference UE. If a new synchronization-reference UE is obtained by the scanning, the timer value can be configured as a start value, but if the existing synchronization-relaying UE is turned into the synchronization-reference UE, the timer value may remain (of course, the UE may set the timer value as an end value before the scanning to thereby induce the scanning operation of the synchronization-relaying UE or the synchronization-receiving UE, which are associated with the UE.

When the synchronization-reference UE adjust the internal reference time according to the synchronization signal received from the nearby synchronization-support UE, the synchronization-relaying UE or the synchronization-receiving UE, which are associated with the synchronization-reference UE, may experience frequent adjustment of the reference time of the synchronization-reference UE. In this case, since the synchronization-relaying UE or the synchronization-receiving UE should keep monitoring the synchronization signal from the associated synchronization-reference UE, it is difficult to attain the low power performance.

Therefore, whenever the internal reference time is adjusted, the synchronization-reference UE may not reflect the adjustment in the synchronization signal, and (may accumulate the records of the adjustment of the reference time and) may change the synchronization signal transmission time shortly after next scheduled synchronization signal transmission is completed. At this time, the synchronization-reference UE may inform of a time offset between the reference time of the current cluster and the reference time of the cluster to be changed to thereby allow the associated synchronization-relaying UE or the associated synchronization-receiving UE to know the next signal transmission time and to maintain the synchronization with the cluster at low power consumption. For another example, the synchronization-reference UE may not promptly reflect the adjustment in the synchronization signal, and (may accumulate the records of the adjustment of the reference time and) may change the timer value into the end value just before changing the synchronization reference time to thereby allow all of the UEs in the cluster to switch to the scanning operation.

The associated UEs that have received the synchronization channel may randomly determine the scanning time after a scanning time determined by the timer, or may perform scanning at a specific time in the period determined according to the number of hops of each UE for prompt scanning. For example, in the case of a maximum of three hops supported, a single synchronization period is divided into four periods so that the first period, the second period, the third predetermined, and the fourth period are used by the SH, the first synchronization-relaying UE, the second synchronization-relaying UE, and the third synchronization-relaying UE, respectively.

Meanwhile, the synchronization-reference UE may not support the inter-cluster synchronization (ICS) according to configuration, so the synchronization-reference UE includes information stating whether or not the ICS is supported in the synchronization channel to be thereby transmitted. Therefore, in only the case where a plurality of synchronization-reference UEs that support the ICS are detected, the UE may operate as the synchronization-support UE.

In the ICS between the synchronization-reference UE and the synchronization-support UE, the timer value is a criterion to obtain the synchronization reference time. In this case, the synchronization-support UE may transmit its own timer value through the synchronization channel. In the ICS, whenever the synchronization-reference UE and the synchronization-support UE, which are adjacent to each other, receive the opponent synchronization signals, the internal reference time can be adjusted. In contrast, the internal reference time can be adjusted only for a specific synchronization signal by applying the timer value as a condition, which is informed of by the synchronization channel related to the received synchronization signal. The comparison of the timer values can be based on the condition in which the synchronization signal of the synchronization-transmitting UE that has the younger timer value, the older timer value, or intermediate timer value can be selected, as described in the embodiments above. Alternatively, comparison of the timer values can be based on the condition in which the synchronization signal of the synchronization-transmitting UE that has the younger or older timer value than the internal timer value of the synchronization-support UE can be used for the ICS.

In some case, a plurality of UEs is required to operate as the synchronization-reference UE in turns according to the result of the scanning operation after the timer value has expired. For example, the UEs further perform the scanning for a specific amount of measuring time after the basic scanning to thereby determine their role. For another example, each of the UEs may perform the scanning at a specific measuring time after the expiration of the timer value and before the scanning start time. Alternatively, a combination of two methods above may be adopted. Additionally, the rule can be made so that the existing synchronization-reference UE has the longer measuring time than other UEs.

Hereinafter, the operation of informing of information on the D2D frame number and the scanning period through the synchronization channel will be described in detail. Moreover, the operation of matching the D2D frame number and information on the scanning period between synchronized UE groups will be described as well.

According to an embodiment of the present disclosure, in the case where the D2D frame number for starting the scanning period is preliminarily determined, and the D2D frame number is matched, the information on the scanning period may not be required. If the D2D frame number for starting the scanning period is able to be adjusted, the UE may make the D2D frame number conform to the nearby UE, and may recognize the scanning start time, based on the scanning period information. The D2D frame number may conform to the nearby UE in various ways as follows. The D2D frame numbers are compared, and the D2D frame number can conform to the D2D frame number of the nearby UE according to a condition. In addition, the time left to the D2D frame number for starting the scanning period (e.g., a frame period unit), i.e., the remaining timer values are compared, and the D2D frame number is adjusted to conform to the remaining timer value of the nearby UE according to a condition. Alternatively, the elapsed time from the D2D frame number for starting the scanning period (e.g., a frame period unit), i.e., the elapsed timer values are compared, and the D2D frame number is adjusted to conform to the elapsed timer value of the nearby UE according to a condition. For example, if the scanning period corresponds to the D2D frame number "0", the D2D frame number and the timer elapsed time may have the same value with respect to the D2D frame.

Figure 21:
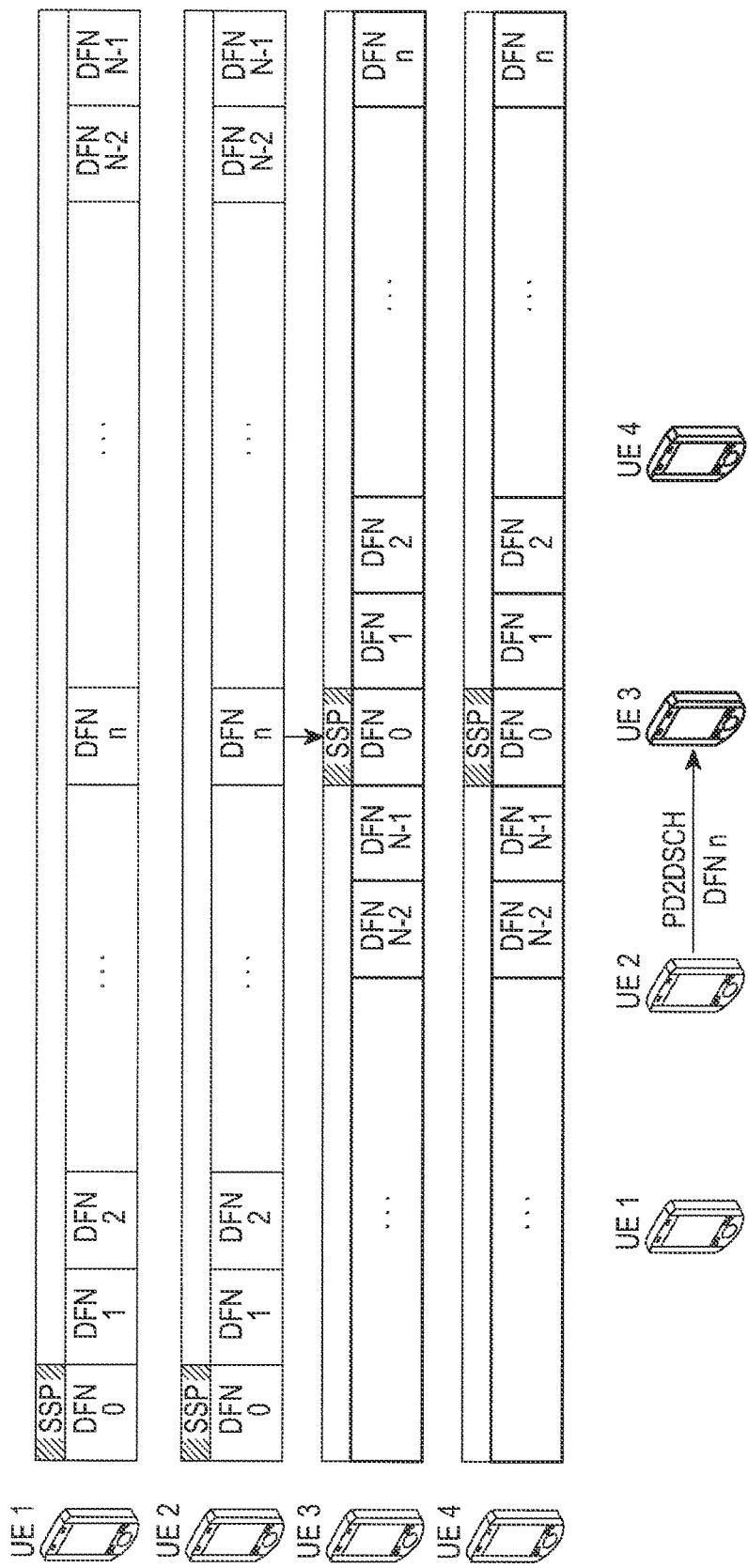
FIGS. 21 and 22 illustrate the operation of a UE according to an embodiment of the present disclosure.
Figure 22:
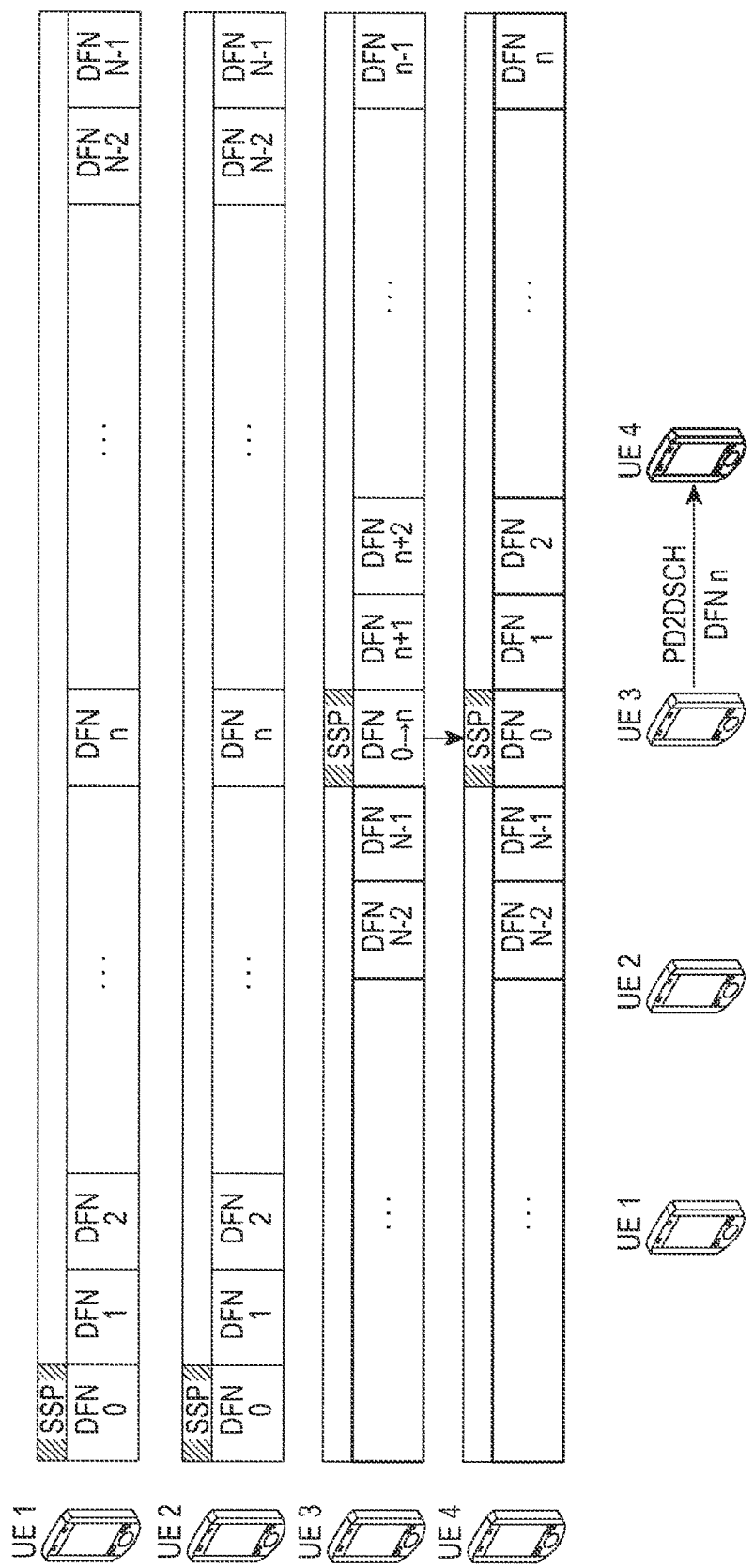

FIG. 21 shows that D2D frame numbers of the UE 1 and the UE 2 match each other, and D2D frame numbers of the UE 3 and the UE 4 match each other, but the D2D frame number of the UEs 1 and 2 does not match the D2D frame number of the UEs 3 and 4.

Referring to FIG. 21, it is assumed that a plurality of synchronization resources are allotted, and the synchronization signal and the synchronization channel are transmitted in every frame period. The D2D frame number of the UE 3 and UE 4 proceeds to the maximum value of N−1, and then returns to "0." In the embodiment, it is assumed that the scanning period (SSP-silent & scanning period) starts from the D2D frame number "0." In this case, since the SSP period starts from the D2D frame number "0," the UE 3 and the UE 4 may stop other D2D operations (i.e., make it silent), and may switch to a mode for scanning the synchronization signal and the synchronization channel. However, in a state in which the frame is not configured with the D2D frame number (DFN), the UE may scan the synchronization signal and the synchronization channel any time.

The UE 3 may compare its own current DFN value of "0" with the DFN value of "n" received from the UE 2, and may change its own DFN value from "0" into "n" according to a condition (here, the greater DFN value is selected). After changing its own DFN value from "0" into "n," the UE 3 may proceed with n+1, n+2, . . . for the consecutive frames according to the changed DFN. The UE 3 may conform to the reference timing indicated by the synchronization signal and the synchronization channel received from the UE 2 that is supposed to follow the comparison result of the DFN values. The operation of obtaining the reference timing includes obtaining a symbol and a frame boundary by means of the synchronization signal, and obtaining the D2D frame number by means of the synchronization channel.

The PD2DSCH is transmitted from the UE 2 to the UE 3, whereas the PD2DSCH cannot be transmitted to the UE 4 because of a limitation of a transmission distance, so the UE 3 needs to inform the nearby UEs of the DFN. Although the UE is not supposed to transmit the D2D signal in the SSP period, in the case above, the UE 3 may transmit the synchronization signal and the synchronization channel.

The UE 4 may receive the synchronization signal and the synchronization channel from the UE 3, and may change the reference timing according to the result of the DFN determination in the same manner as the UE 3 receives the synchronization signal and the synchronization channel from the UE 2, and changes the reference timing according to the result of the DFN. The UE 4 may transmit the synchronization signal and the synchronization channel using available resources in the same way as the UE 3 transmits the synchronization signal and the synchronization channel (see FIG. 22).

In order to transfer the DFN information more widely during the SSP, the more synchronization resources should be set in the frame structure. However, allocation of the more synchronization resources may bring about a lack of other control and data resources, so the synchronization resources are limited. Finally, the maximum number of relays of the synchronization signal and the synchronization channel including the DFN is determined according to the limited number of synchronization resources.

For example, in the case where four synchronization resources are given during the SSP, if the synchronization channel of the greater DFN value is received after using the first synchronization resource, the UE may transmit the synchronization signal using the second synchronization resource. Another UE that has received the synchronization signal may transmit the synchronization signal using the third synchronization resource. In addition, still another UE that has received the synchronization signal may transmit the synchronization signal using the fourth synchronization resource. Consequently, the relay of the synchronization signal can be made up to three times.

Although the SSP is configured to use a single frame period, a plurality of frame periods can be configured as the SSP according to a design. In this case, since the period for which the typical D2D operation is stopped is prolonged, it is preferable to make the SSP period short.

The UE may select the resource for transmitting the synchronization signal and the synchronization channel from among the synchronization resources in the predetermined frame period. Even though available resources have expired after changing the reference timing, in order to transfer the same, the SSP is required to be extended. For example, if there is no available resource for transmitting the DFN changed by the UE 4 through the synchronization signal in the SSP, or if no more synchronization resources except for only one synchronization resource exist in the SSP for transmission after receiving the synchronization signal, the UE may return to previous reference timing and includes an SSP extension request message in the synchronization channel to be thereby transmitted (see FIG. 22). The nearby UE that has received the synchronization channel may identify the SSP extension request message to thereby stop other D2D operations except for receiving the synchronization signal (if necessary, according to determination).

The UE 4 may change the obtained reference timing to thereby transmit the synchronization signal, and the reference timing is changed according to the determination of the nearby UEs that have received the synchronization signal. The UEs that recognized the non-synchronization state and the UEs that have extended the SSP according to the SSP extension request message may receive the synchronization signal from the nearby UE, and if the non-synchronization between the UEs having the same or a high priority of the timer or the DFN does not occur any more, the UEs may terminate the SSP to return to the normal D2D operation. At this time, during the SSP period, the timing is obtained from the synchronization signal received from the UE having the same or a high priority, and the synchronization can be performed based thereon. The synchronization between the UEs can be performed according to an earliest timing base, an average timing base, a pulse-coupled oscillator base, an age base, or the like. According to an embodiment of the present disclosure, the synchronization between the UEs is made in the case of the synchronization signal from the UE having the same priority, and the hierarchical synchronization is made in the case of the synchronization signal from the UE having a high priority. The hierarchical synchronization refers to the case in which the UE conforms to the timing indicated by the received synchronization signal.

According to an embodiment of the present disclosure, during the SSP period, only the scanning is conducted. In addition, if the changing condition is satisfied, the previous reference timing remains at the next frame, and a reference timing change message is transmitted through the synchronization channel. The reference timing change message includes a reference timing to be changed or a time offset with respect to the reference timing to be changed. The reference timing may mean a symbol unit or a frame unit. The reference timing change message includes a current DFN value necessary for determination. The nearby UE that has received the DFN value may compare its own DFN with the DFN of the reference timing change message, and if the condition is satisfied, the nearby UE may change the reference timing. In this case, the reference timing change message is transmitted through the synchronization channel at the next frame as well. After sending the reference timing change message, the UE may perform the D2D operation according to a new reference timing to be changed at the next frame.

The reference timing change message is transmitted only when the condition for changing the reference timing is satisfied. Thus, the synchronization channel is configured with normal synchronization channel information at the usual time, and the reference timing change message should be informed of by one-bit information. For example, if a reference timing change bit among information fields of the synchronization channel switches from the off-status to the on-status, the reference timing change message can be configured as necessary information except for some common information fields when the reference timing is changed. The information necessary for changing the reference timing includes a timer value, an absolute value or a relative value for a symbol timing to be changed, an absolute value or a relative value for the D2D frame number to be changed, or the like.

Although the UE that has recognized the DFN non-synchronization state directly send the SPP extension request message or the reference timing change message to other UEs in the present embodiment, the UE may indirectly inform of the same according to another embodiment. For example of the indirect methods, the UE may change the DFN in the typical PD2DSCH to be informed of, or may change the timing of the synchronization signal so that the nearby UEs listens to a typical synchronization resource or receives the synchronization signal in the SSP period to thereby recognize the same.

Figure 23:
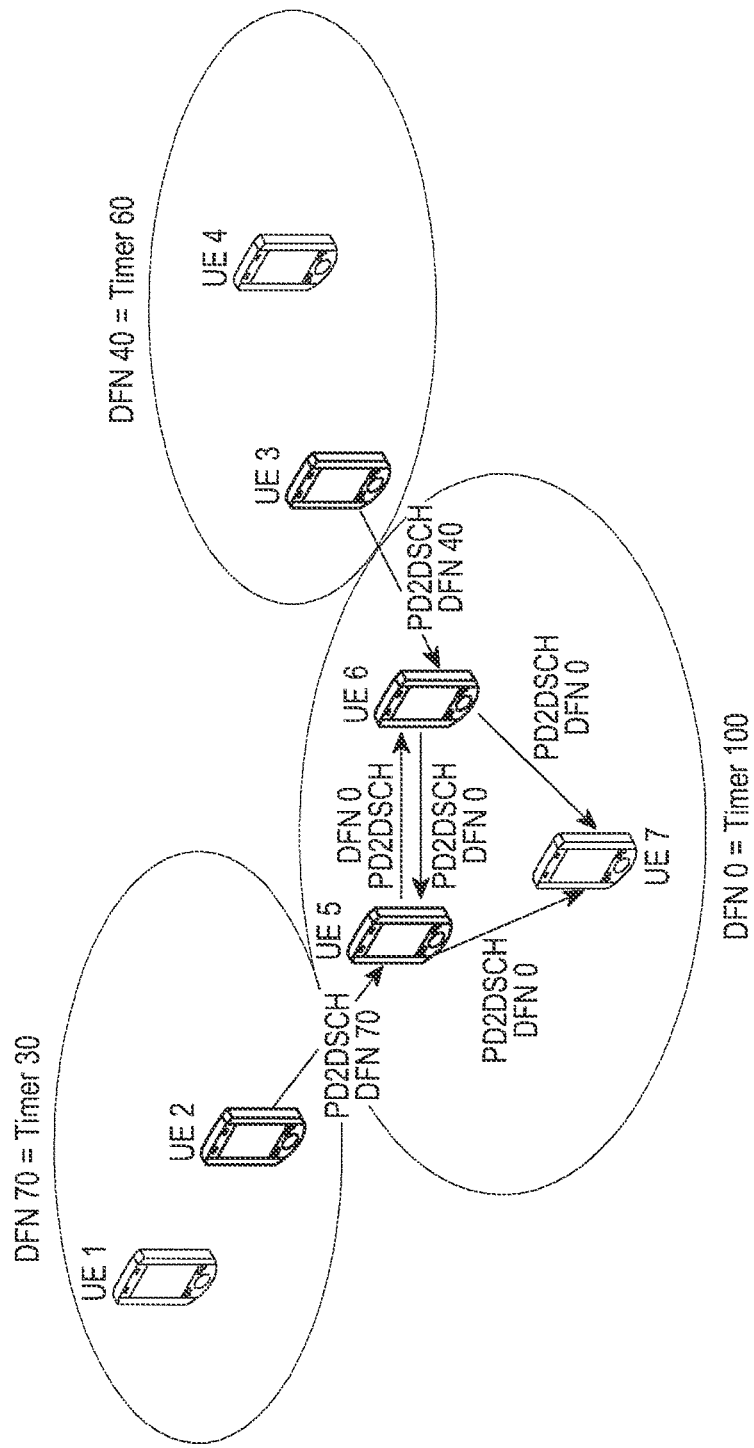
FIGS. 23 to 25 illustrate the synchronization between different synchronization groups based on a timer or a D2D frame number (DFN)
Figure 24:
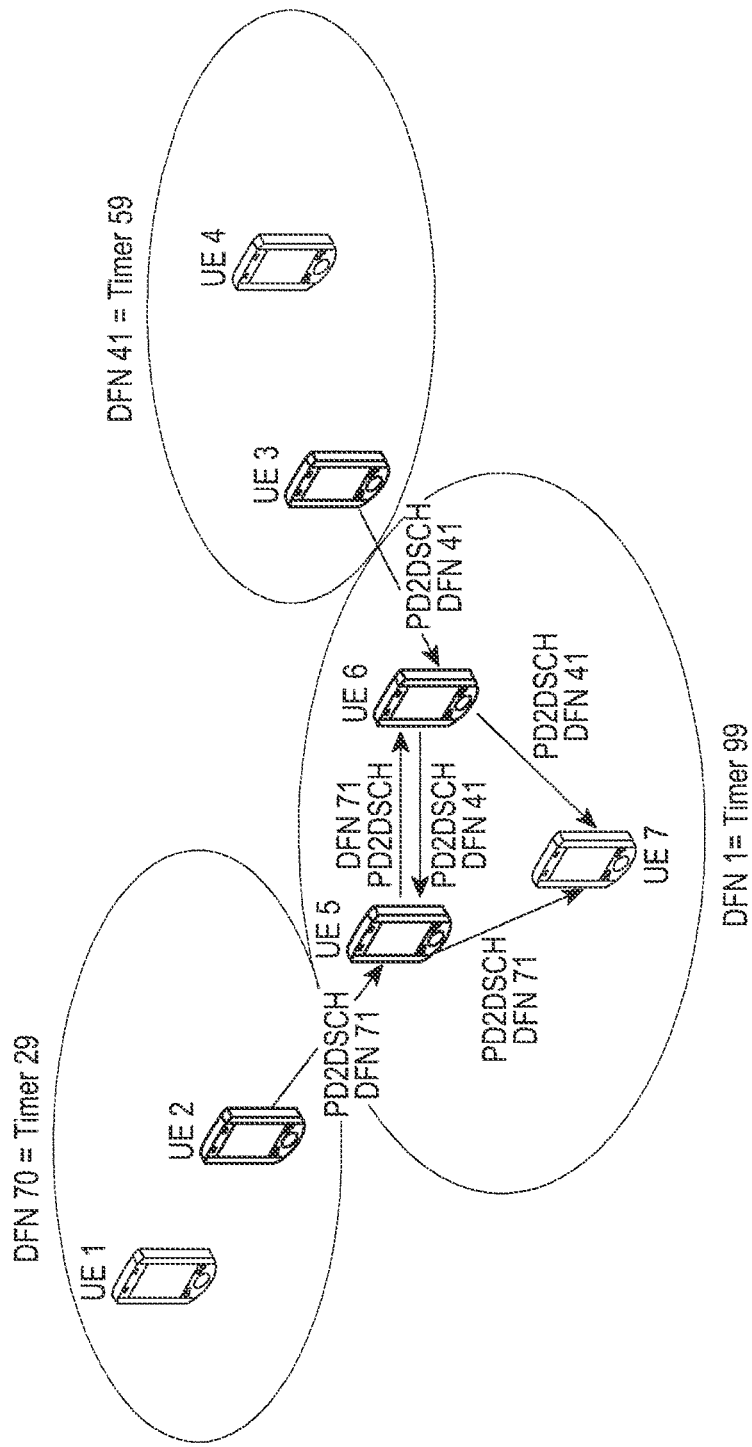
Figure 25:
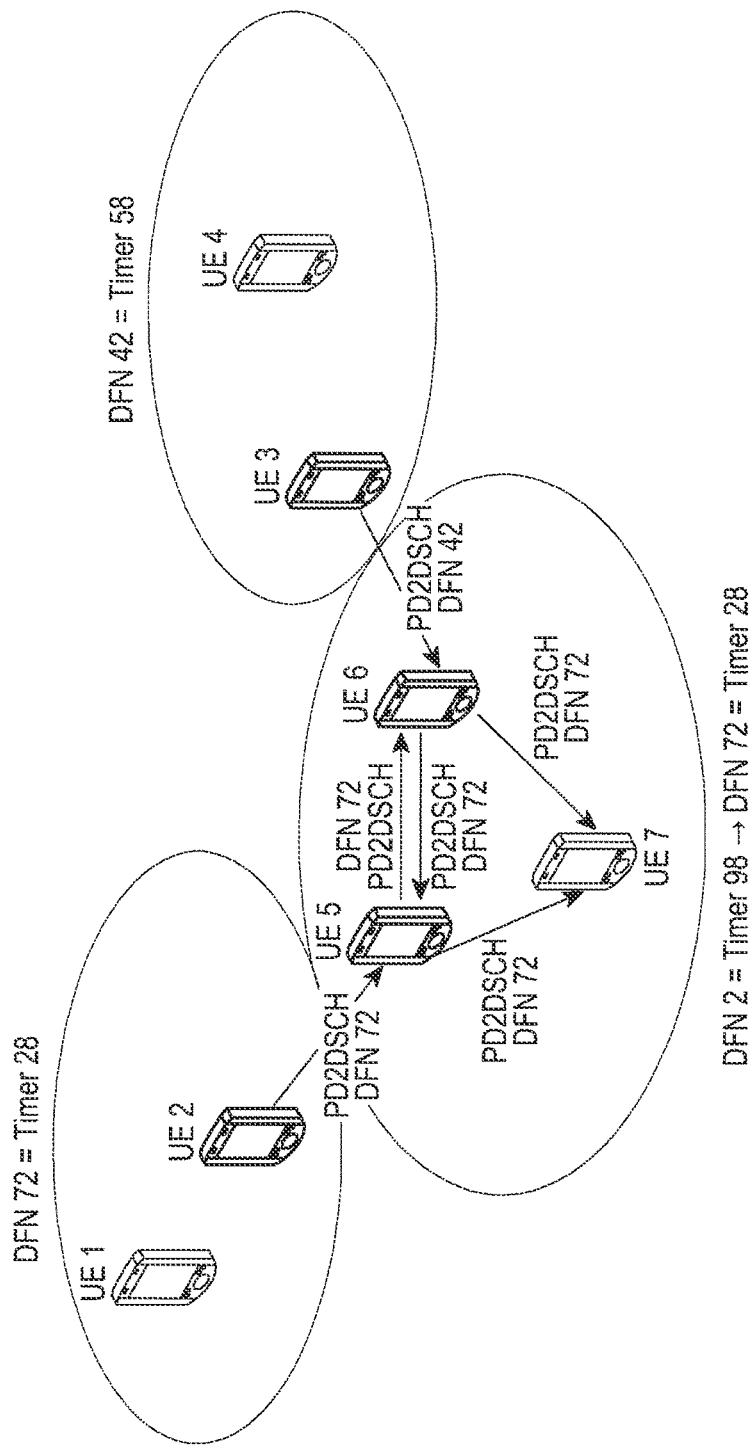

FIGS. 23 to 25 illustrate the synchronization between different synchronization groups based on the timer or the D2D frame number (DFN). In FIGS. 23 to 25, it is assumed that the entire DFN is 100, and the SSP occurs at the DFN 0.

The DFN of the UEs 1 and 2 is 70 (the timer value is 30), and the DFN of the UEs 3 and 4 is 40 (the timer value is 60). In addition, the SSP period starts at the DFN 0 (the timer value is 100) in the UEs 5, 6 and 7. The UEs 2, 3, 5 and 6 are synchronization transmitting UEs.

Referring to FIG. 23, the UE 5 may compare its own DFN value of 0 with the received DFN value of 70, and determine to conform to the greater DFN of 70. In terms of the timer value, the UE compares its own timer value of 100 with the received (or calculated from the received DFN) timer value of 30, and determines to conform to the smaller DFN of 30. Hereinafter, the description will be made in terms of the DFN. The UE 6 may compare its own DFN value of 0 with the received DFN value of 40, and may determine to conform to the greater DFN of 40.

FIG. 24 illustrates the operation after one D2D frame has passed in FIG. 23.

Referring to FIG. 24, the UEs 5 and 6 can extend the SSP because they have not re-synchronized with nearby UEs. The UE 7 has not recognized the non-synchronization state in FIG. 23 above, so the UE 7 has terminated the SSP period and performed the normal operation. However, since the UE 5 and 6 transmit the changed DFN through the synchronization channel, the UE 7 may receive the same to thereby recognize the non-synchronization state. The UEs 5 and 6 may directly inform the UE 7 of the same through the SSP extension request message or the reference timing change message. The UE 7 may compare the DFN value of 71 from the UE 5 with the DFN value of 41 from the UE 6, and may determine to conform to the greater DFN value of 71. The UE 6 may compare its own DFN value of 41 with the DFN value of 71 from the UE 5, and may determine to conform to the greater DFN value of 71 as well. The UE 5 may compare its own DFN value of 71 with the DFN value of 41 from the UE 6, and may determine to maintain its own DFN value that is relatively big.

FIG. 25 shows the operation after the DFNs between the nearby UEs match each other.

Referring to FIG. 25, the UEs 5 and 7 may terminate the SSP, and may operate from the next frame according to the synchronization symbol and the frame timing, which are supposed to conform to the DFN value because the DFN value from the nearby UE matches its own DFN value. Although the DFN value from the UE 3 is different from the DFN value of the UE 6, the UE 6 may determine that the priority is low because the value thereof is small and to thereby disregard the same. The UE 6 may determine that the synchronization with the UE having the same or a high priority has been made, and may terminate the SSP to thereby operate from the next frame according to the synchronization symbol and frame timing, which are supposed to conform to the DFN value.

The embodiment above provided a method by which the SSP period is configured as the same DFN, and if re-configuration of the DFN is required, the SSP period is prolonged or the reference timing is changed. In contrast, another method can be provided, by which the SSP period is configured to be different in order to reduce additional signals. In spite of that, since low power consumption and prevention of interference, which are aimed at by scanning, are required, a method by which a plurality of SSP periods are configured in sequence, and the nearby UEs have the different SSP periods from each other, can be provided.

For example, if the SSP period is configured as the DFNs of 0, 1, and 2, the SSP periods transmitted by the nearby UEs in terms of one UE are the DFN of 0 and the DFN of 2, the UE may determine the DFN of 1 as its own SSP period. At this time, in the SSP period of the nearby UE, the D2D signal transmission except for the synchronization signal may be stopped, and all of D2D signal transmission may be stopped in its own SSP period. According to this, the UE that has determined the DFN of 1 as the SSP may know that the UE that has determined the DFN of 0 as the SSP has changed the reference timing. The UE that has determined the DFN of 2 as the SSP may know that the UE that has determined the DFN of 1 and the DFN of 1 as the SSP has changed the reference timing. When the UE recognizes the change of the reference timing, the UE may continue to prolong the SSP until the symbol timing synchronization and the matching of the DFN are completed.

The embodiment above should be applied to the case where some of the UEs transmit and receive the synchronization signal and the synchronization channel, and the others only receive the synchronization signal and the synchronization channel as well as the case all of the UEs transmit and receive the synchronization signal and the synchronization channel. Therefore, in the case of FIG. 24, if the UEs 5 and 6 are not located within an available distance for transmission from each other, since the UE 7 does not transmit the synchronization signal and the synchronization channel, the matching of the DFN between the UEs 5, 6 and 7 is difficult. In this case, if the UE 7 receives DFN of 71 from the UE 5 first and then receives DFN of 41 from the UE 6, the UE 7 should recognize the difference between two DFNs, and should transmit the synchronization signal and the synchronization channel. The UE 7 that has recognized the difference between the DFNs may identify and select a resource from among available resources, and may transmit the synchronization signal and the synchronization channel. If there is no available resource, the synchronization signal and the synchronization channel may not be transmitted. The identification of the available resource, the sequence of the synchronization signal, and information on the synchronization channel are determined based on the synchronization resource, the synchronization signal, and the synchronization channel of the UE that has transmitted the DFN of a high priority determined according to the DFN priority.

The embodiment above shows that the resource is obtained by scanning the available resources. However, various synchronization resource selection methods rather than the method set forth above may be adopted. Basically, a method for randomly selecting a certain resource as the synchronization resource can be considered. However, this method cannot deal with various problems. For example, in order to address a half-duplex problem, it is assumed that two or more synchronization resources exist in a single synchronization period in the synchronized UE group.

According to an embodiment, the UE may use one of three synchronization resources first, and may determine whether or not to use the remaining idle synchronization resources for sensing.

For example, the UE may identify that there is no existing synchronization-transmitting UE nearby through the scanning, and may select a resource according to a certain or a specific condition to thereby transmit the synchronization signal using the selected synchronization resource. The specific condition can be determined in consideration of the received power or the role of the synchronization-reference UE. Since the synchronization resource for transmitting the synchronization signal has already been occupied, other UEs can perform the scanning.

The UE that has recognized the existence of two idle synchronization resources may select a synchronization resource according to a certain or specific condition, or the sequence of resources, and may transmit the synchronization signal using the selected synchronization resource. The fact that the UE has recognized the existence of two idle synchronization resources means that the condition for a synchronization-support UE has been satisfied. The specific condition can be the reception power, or the resource position for the synchronization-support UE, and the sequence of resources may refers to an order of selecting the synchronization resources. That is, the sequence of resources can be used for the information indicating the synchronization resource to be selected next.

The UE that has satisfied a predetermined condition for the synchronization-reference UE may change the synchronization signal into the same synchronization-transmitting UE ID in the same sequence or the synchronization channel as the synchronization signal with respect to the resource that is selected according to a certain or a specific condition, and may transmit the same.

The predetermined condition for the synchronization-reference UE is defined according to a criterion in which another UE performs scanning, identifies one occupied resource and two idle resources, and conforms to the timing of the synchronization signal received in the occupied resource. The specific condition is defined by the reception power or the resource position for the SH UE. The transmission of the synchronization signal after the change into the same synchronization-transmitting UE ID in the synchronization channel can be applied to the case of a different sequence.

The resource selection method according to the role of the synchronization signal among the resource selection methods further considers the following operation.

For example, a method for separating the synchronization-transmitting UE, the synchronization-reference UE, and the synchronization-support UE is required. This can be performed by separating a synchronization sequence or by including a separation field in the synchronization channel to be transmitted. Alternatively, it is separated by the DFN determined according to the synchronization resource position. In this case, the synchronization-receiving UE may perform receiving synchronization tracking to store the reception timing for the synchronization signal of the synchronization-reference UE. However, in the case of the synchronization-support UE, the synchronization-receiving UE may exclude the synchronization signal of the synchronization-support UE from the receiving synchronization tracking. In spite of that, the synchronization-reference UE may use the signal of the synchronization-support UE for the transmitting synchronization process.

According to an embodiment of the present disclosure, the synchronization channel includes an offset value that shows a time difference from the start point (a reference point) of a single synchronization period.

Figure 26:
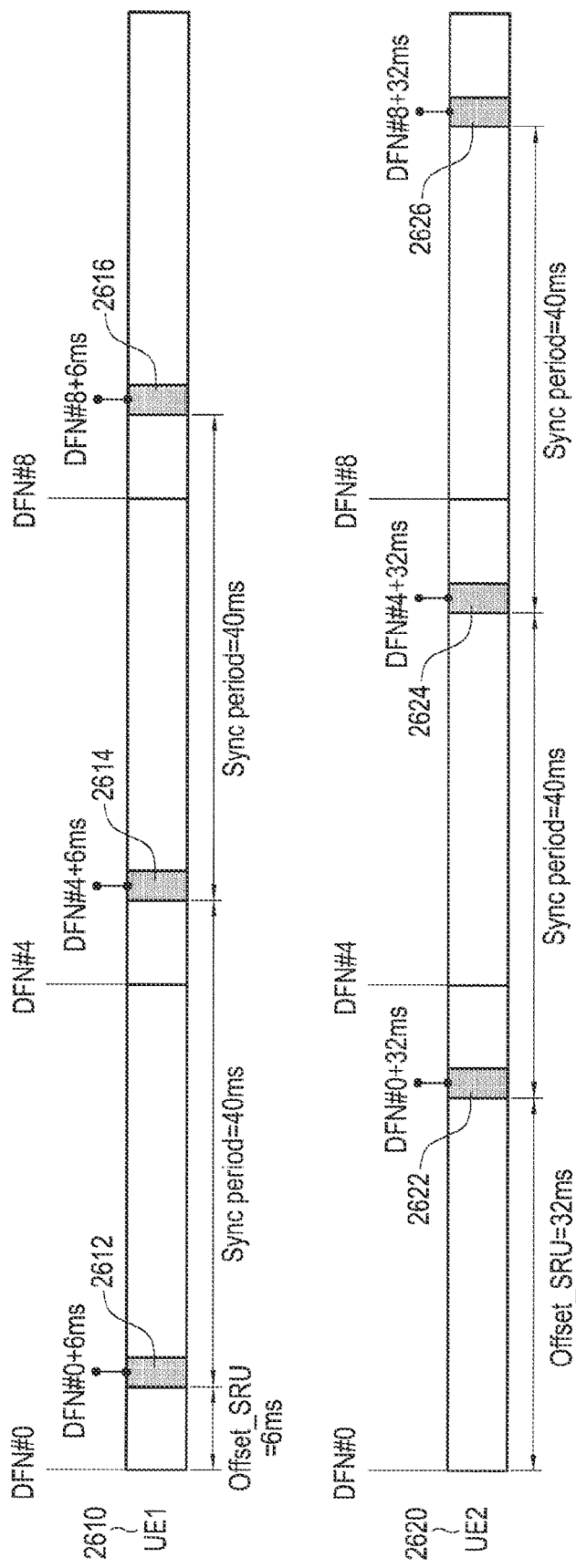
FIG. 26 illustrates an example in which a UE transmits a synchronization signal.

FIG. 26 illustrates an example in which the UE transmits the synchronization signal.

Referring to FIG. 26, the UE 1 (2610) and the UE 2 (2620) are the synchronization-transmitting UE. If the offset is not configured, the synchronization-transmitting UE generally transmit the synchronization signal as the start point of the DFN #0. If the offset is configured, the synchronization-transmitting UE may transmit the synchronization signal at the start point reflecting the configured offset.

The offset of the synchronization-transmitting UE is configured by the base station or by the synchronization-reference UE. Either the base station or the synchronization-reference UE may configure the start position of the periodic synchronization resource (40 ms in the embodiment), i.e., the offset to each synchronization-transmitting UE in terms of the resource management and the control of interference. For example, the UE 1 (2610) is configured as the offset of 6 ms (offset_SRU), and UE 2 (2620) is configured as the offset of 32 ms (offset_SRU). In this case, the UE 1 (2610) may transmit the synchronization signal at DFN #0+6 ms (2612), DFN #4+6 ms (2614), and DFN #8+6 ms (2616), respectively, considering one synchronization period (sync period=40 ms). The UE 2 (2620) may transmit the synchronization signal at DFN #0+32 ms (2622), DFN #4+32 ms (2624), and DFN #8+32 ms (2626), respectively, considering one synchronization period (sync period=40 ms). The UE may calculate (or determine) the synchronization resource in the system in which the synchronization period and the DFN period are different from each other, by considering a transformation rule. For example, in the system in which two synchronization periods corresponds to one DFN (e.g., 40 ms*2=80 ms), the UE 1 (2610) may express the synchronization resource as DFN #0+6 ms and DFN #0+46 ms.

According to the embodiment above, the start points where the UE 1 (2610) and the UE 2 (2620) transmit the synchronization signal can be different, but the reference timings (DFN #0, DFN #4, and DFN #8) thereof may match each other.

Figure 27:
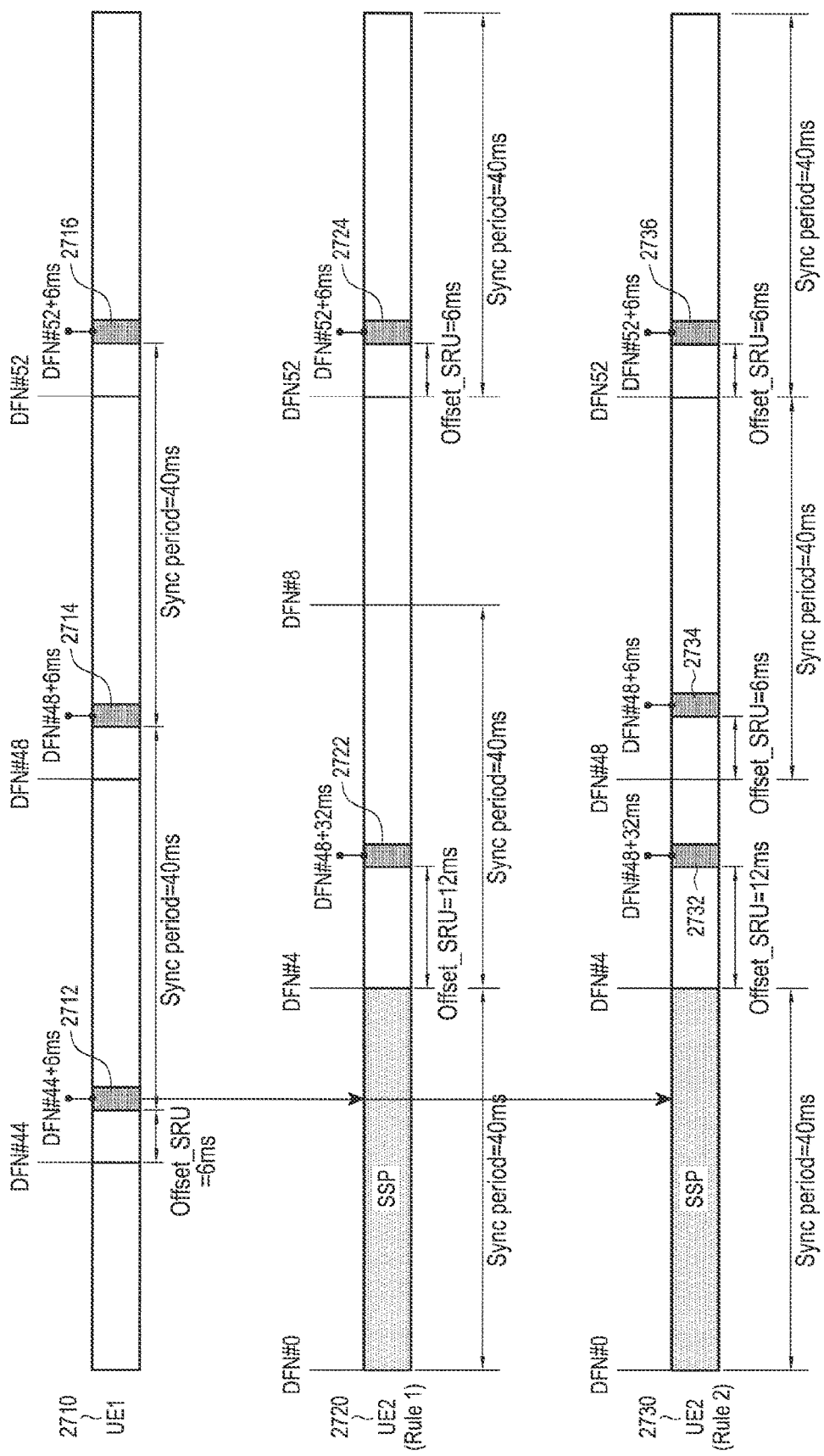
FIG. 27 illustrates an example in which a UE transmits a synchronization signal according to an embodiment of the present disclosure.

FIG. 27 illustrates an example in which the UE transmits a synchronization signal according to an embodiment of the present disclosure. FIG. 27 is based on the synchronization method for matching the timing, the DFN, and the offset.

Referring to FIG. 27, the UE 2 (2720 or 2730) may receive the synchronization signal of the UE 1 (2710) to obtain the timing, and may perform an operation of matching the DFN and the offset in the scanning period {silent & scanning period (SSP)}, based on the obtained timing.

To this end, two different rules may be considered.

The UE 2 (2720 or 2730) operates according to the first rule as follows.

The UE 2 (2720 or 2730) is configured as the offset of 12 ms, and performs the scanning in the SSP period. The UE 2 (2720 or 2730) that has received the synchronization signal of the UE 1 (2710) in the SSP period may maintain the existing timing for a predetermined time (e.g., for one synchronization period) without promptly changing the timing to adjust the symbol and the frame boundary. During the time, the UE 2 (2720 or 2730) may inform of the DFN to be changed and offset information on the reference timing of the synchronization period to be changed using the existing synchronization resource. Since the offset value transmitted by the UE 2 (2720 or 2730) is 26 ms, the UE that has received the same may recognize that the synchronization signal has been received 26 ms ago from the current timing, and may inform of the DFN to be changed and offset information on the reference timing to be changed in the next synchronization resource in the same manner as the operation of the UE 2 (2720 or 2730).

The UE that has informed of the change information may maintain the existing timing for the corresponding period, and may perform the operation by applying the changed timing after a gap period for timing adjustment. The UE that has received the change information may maintain the existing timing for the corresponding period, and may perform scanning for one period in order to receive timing information and system information by applying the changed timing after a gap period for timing adjustment.

The operation of the UE 2 (2720 or 2730) according to the second rule is similar to the operation according to the first rule, but it is different in that the UE that has informed of the change information may perform the operation by applying the changed timing shortly after informing of the information (DFN and offset) to be changed without maintaining the existing timing for the corresponding period. Likewise, the UE that has received the change information may perform scanning for one period at the coming reference timing to be changed.

Figure 28:
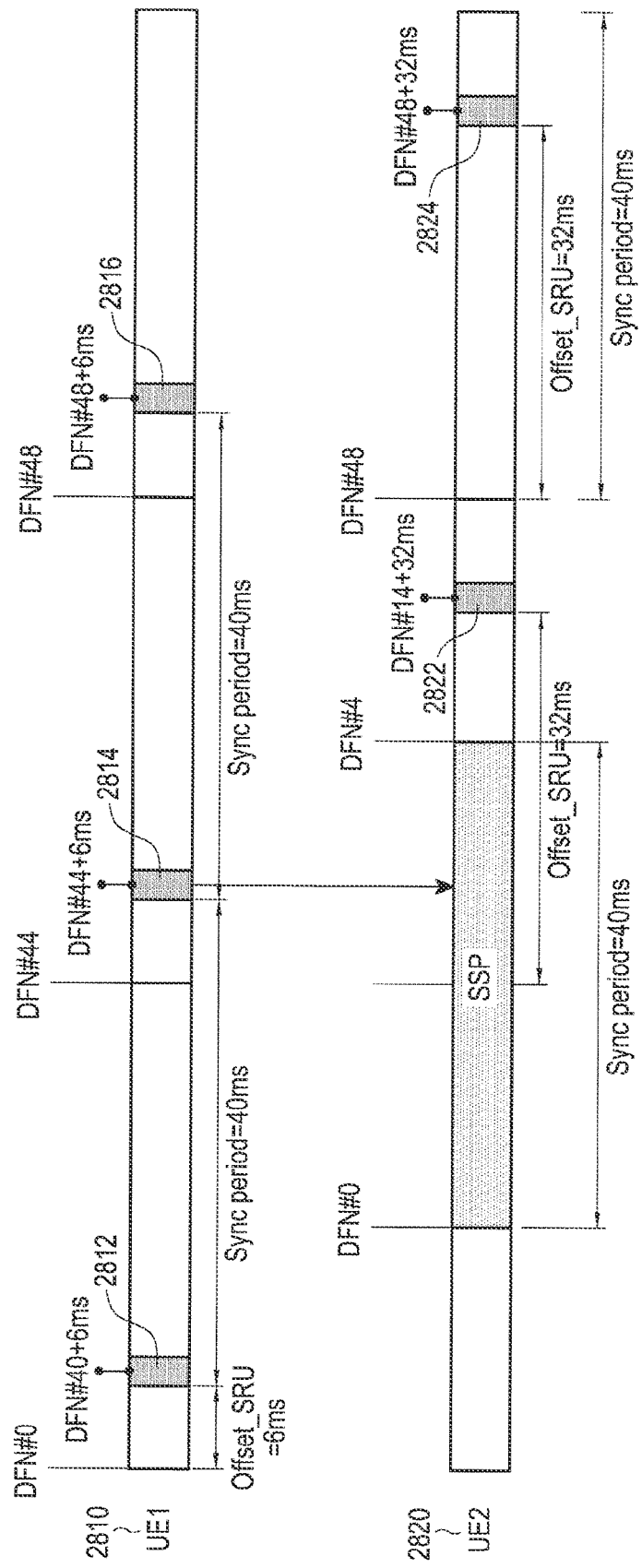
FIG. 28 illustrates another example in which a UE transmits a synchronization signal according to an embodiment of the present disclosure.

FIG. 28 illustrates another example in which the UE transmits the synchronization signal according to an embodiment of the present disclosure. FIG. 28 is based on the synchronization method for matching the timing, and the DFN, even though the offset is not matched.

Referring to FIG. 28, the UE 2 (2820) is configured as the offset of 32 ms, and may perform scanning in the SSP period. The UE 2 (2820) that has received the synchronization signal of the UE 1 (2810) in the SSP period may maintain the existing timing for a predetermined time (e.g., by the reference timing of the changed timing) without promptly changing the timing to adjust the symbol and the frame boundary.

The UE 2 (2820) may show the synchronization-reference timing (the time earlier by the offset of 6 ms than the synchronization resource of the UE 1) indicated in the UE 1 (2810) by adjusting the offset value without changing the absolute time of the existing synchronization resource. The UE 2 (2820) may transmit synchronization information and system information to be changed through the synchronization signal in the synchronization resource that comes first after the SSP period. According to an embodiment of the present disclosure, the synchronization can be rapidly performed in the SSP period, based on a method in which the synchronization channel informs of the offset for the reference timing, or a beacon (or broadcast channel) message informs of the offset for the reference timing.

The problem of the distributed synchronization is that it takes a long time to make synchronization in the case of passing through a plurality of UEs because the timing determined in a period is to be applied the next period as well. In order to compress the synchronization operation, the synchronization operation is performed in a shorter period than a typical period in the SSP period.

For example, the signal is transmitted in a synchronization period of 100 ms at the usual time, but is transmitted in a synchronization period of 10 ms in the SSP period. At this time, the reference timing provided by the offset is configured based on the existing synchronization period of 100 ms.

That is, even though the transmission period becomes short in the SSP period, the logical period remains.

In the case of the offset configured, the offset is combined with the DFN to be thereby transmitted without sending it as a separate signal through the synchronization channel. For example, in the case of a DFN that can express 1023 ms in total by each 40 ms unit, 8 bits are required.

The offset requires 6 bits to express 40 ms with accuracy of 1 ms. "DFN+offset" is expressed as 14 bits in total.

According to an embodiment of the present disclosure, in order to accurately compare the different synchronization-transmitting UEs with each other, the offset value should be excluded. For example, "DFN #5+10 ms" and "DFN #5+20 ms" actually belong to DFN #5, but offsets, i.e., 10 ms and 20 ms, thereof are different.

Accordingly, the DFN excluding the offset is used for the comparison. For example, a most significant bit (MSB) of 8 bits among 14 bits is used for the comparison of the DFN. Alternatively, a least significant bit (LSB) of 8 bits among 14 bits is used for the comparison of the DFN The DFN having a sufficient size is suitable to be used for the comparison of the nearby synchronization-transmitting UEs. For example, in the case of a rule in which the bigger DFN has the higher priority, when the nearby UE receives the DFN just before the DFN reaches the maximum value, the UE that has reached the maximum value may return to the minimum value of the DFN #0 soon so that the UE cannot act as the synchronization-transmitting UE. In order to prevent the problem above, when the UE receives a DFN value more than a specific DFN value and equal to or less than the maximum DFN value, the UE may disregard the DFN value. On the contrary, in the case of a rule in which the smaller DFN has the higher priority, when the UE receives a DFN value equal to or more than zero and less than a specific DFN value, the UE may disregard the DFN value.

Even with various embodiments for synchronization between the UEs, perfect synchronization performance may not be guaranteed due to the limitations of implementation and algorithms. In consideration of circumstances above, in addition to the UEs of which the SSPs match each other, the nearby synchronization-transmitting UEs of which the SSPs do not match each other may not transmit other signals except for the synchronization signal to thereby reduce interference when receiving the synchronization signal.

For example, in the case where the SSP periods of the UE 1, the UE 2, and the UE 3 are configured to start in 100 ms, 70 ms, and 40 ms, respectively, which are not synchronized with each other, the UE 1 and the UE 2 may not transmit other signals except for the synchronization signal in the SSP period of the UE 3. The UE 3 may successfully receive the synchronization signals from the UE 1 and the UE 2 in the SSP period with no interference from the same. At this time, each UE may accumulate SSP period information of the nearby synchronization-transmitting UE, which has been obtained in at least one scanning period before to thereby apply the operation above.

According to an embodiment, the synchronization information is changed according to the synchronization information that has a higher priority by receiving the synchronization channel including the timing change message or the offset according to an embodiment of the present disclosure. Likewise, after transmitting the timing change message or the synchronization channel, the UE may change the reference timing and the DFN according to the synchronization information to be changed to thereby perform the operation. If the received power of the timing change message or the synchronization channel is more than a specific threshold, that means that the UE is located nearby, so the operation of transmitting the timing change message or the synchronization channel may be omitted.

Hereinafter, the determination of the synchronization-transmitting UE using the quality of the synchronization signal will be described in detail with reference to FIGS. 3, 18 and 19.

The synchronization-transmitting UE is determined according to the quality of the received synchronization signal as follows. The quality of the synchronization signal is determined reference signal received power (RSRP), reference signal received quality (RSRQ), or other measurement equations.

The RSRP refers to an average of the received power over the entire band with respect to the resource allotted with the reference signal in each cell. The RSRP is determined as the following equation.

$$RSRQ = N * RSRP/RSSI$$

Here, the received signal strength indication (RSSI) is the sum of the received power over entire using band, and N denotes the number of resource blocks allotted with the RSRP. Since the RSRP is an average value, "N*RSRP" refers to the sum of the received power with respect to the resources allotted with the reference signal in each cell. That is, the RSRP denotes a ratio of the received power over the entire band to the received power of the reference signal in each cell.

Referring to FIG. 3, when the signal of a single synchronization-reference UE is received, the criterion by which the synchronization-relaying UE is determined using the RSRP is expressed as the following Equation 1.

$$RSRP_{I\text{-}SS_1} \leq X \text{ dBm} \qquad \text{Equation 1}$$

Here, dBm is an absolute value that is obtained by calculating the received power (dB) with respect to mW. In addition, when a single synchronization-reference UE signal is received, the criterion by which the role of the synchronization-relaying UE is determined using the RSRQ is expressed as the following Equation 2.

$$RSRQ_{I\text{-}SS_1} \leq X \text{ dBm} \qquad \text{Equation 2}$$

The Equations 1 and 2 are used for criteria for creating the synchronization-relaying UE. According to this, the number of synchronization-relaying UEs can be reduced to thereby attain the low power performance.

Figure 18:
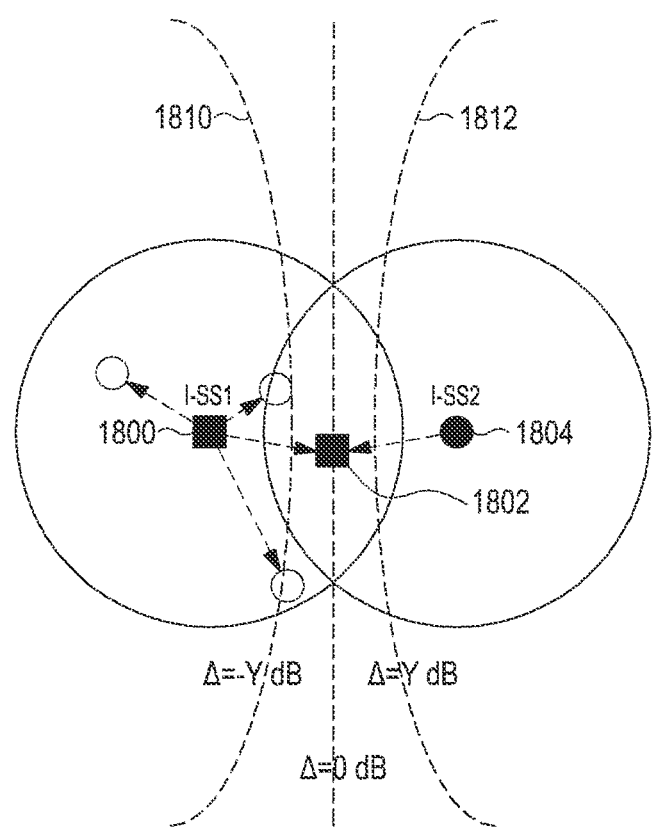
FIG. 18 illustrates a method of determining a synchronization-transmitting UE between two synchronization-reference UEs according to an embodiment of the present disclosure.

FIG. 18 is an example illustrating a method of determining a synchronization-transmitting UE between two synchronization-reference UEs according to an embodiment of the present disclosure.

A dotted line 1810 refers to the line that connects the points where values obtained by subtracting the received power from the I-SS2 (1804) from the received power from the I-SS1 (1800) correspond to a specific critical value (Y dB). A dotted line 1812 refers to the line that connects the points where values obtained by subtracting the received power from the I-SS1 (1800) from the received power from the I-SS2 (1804) correspond to a specific critical value (Y dB). At this time, the UE 1802 that is located at the position, which belongs to the communication area of the synchronization-reference UE 1800 and 1804, and where the difference value of the received power is less than Y dB (that is, located between the dotted lines 1810 and 1812) is determined as the synchronization-transmitting UE.

Referring to FIG. 18, when the signals of two synchronization-reference UEs are received, the criterion by which the synchronization-transmitting UE is determined using the RSRP is expressed as the following Equation 3.

$$|RSRP_{I\text{-}SS_1}-RSRP_{I\text{-}SS_2}|\leq Y\ dB \quad \text{Equation 3}$$

When the signals of two synchronization-reference UEs are received, the criterion by which the synchronization-transmitting UE is determined using the RSRQ is expressed as the following Equation 4.

$$|RSRQ_{I\text{-}SS_1}-RSRQ_{I\text{-}SS_2}|\leq Y\ dB \quad \text{Equation 4}$$

The synchronization-transmitting UE determined according to Equation 3 or Equation 4 can be a new synchronization-reference UE, synchronization-support UE, or synchronization-relaying UE.

Figure 19:
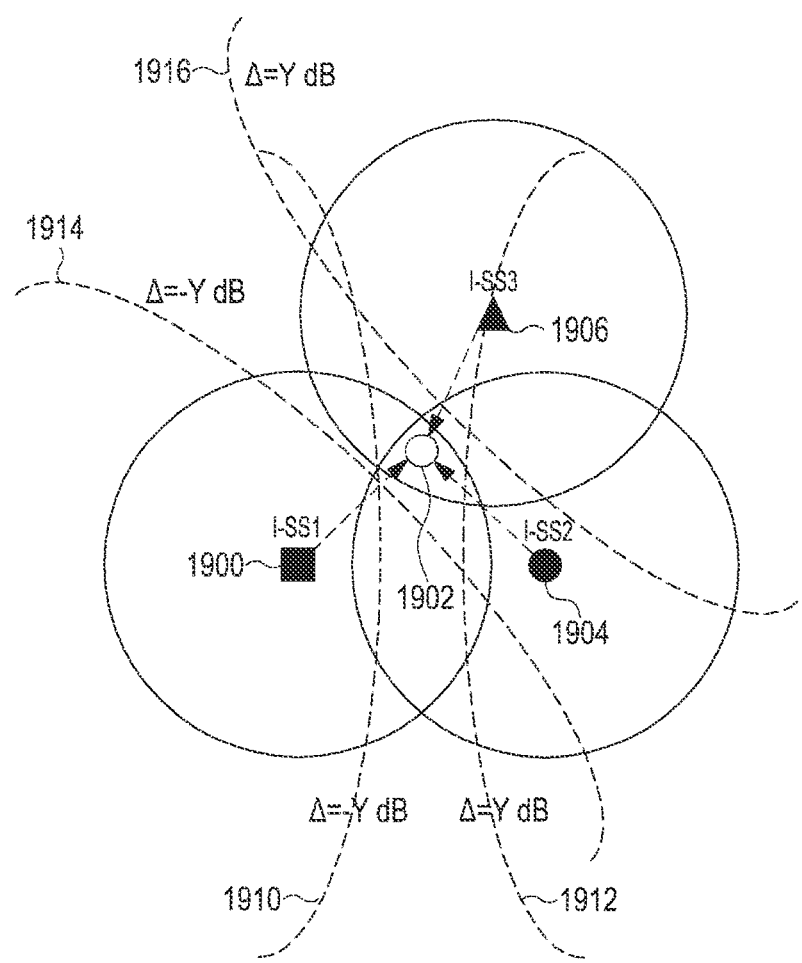
FIG. 19 illustrates a method of determining a synchronization-transmitting UE between three synchronization-reference UEs according to an embodiment of the present disclosure.

FIG. 19 is an example illustrating a method of determining a synchronization-transmitting UE between three synchronization-reference UEs according to an embodiment of the present disclosure.

A dotted line 1910 refers to the line that connects the points where values obtained by subtracting the received power from the I-SS2 (1904) from the received power from the I-SS1 (1900) correspond to a specific critical value (Y dB). A dotted line 1912 refers to the line that connects the points where values obtained by subtracting the received power from the I-SS1 (1900) from the received power from the I-SS2 (1904) correspond to a specific critical value (Y dB). A dotted line 1914 refers to the line that connects the points where values obtained by subtracting the received power from the I-SS3 (1906) from the received power from the I-SS1 (1900) correspond to a specific critical value (Y dB). A dotted line 1916 refers to the line that connects the points where values obtained by subtracting the received power from the I-SS1 (1900) from the received power from the I-SS3 (1906) correspond to a specific critical value (Y dB).

At this time, the UE 1902 that is located at the position, which belongs to the communication area of the synchronization-reference UE 1900, 1904 and 1906, and where the difference value of the received power is less than Y dB (that is, located between the dotted lines 1910 and 1912, and between the dotted lines 1914 and 1916) is determined as the synchronization-transmitting UE. That is, in the case of three synchronization heads, i.e., I-SS1 (1900), I-SS2 (1904), and I-SS3 (1906), with which the UE 1902 is associated, the criterion of the received power is applied to each SH.

Referring to FIG. 19, when the signals of three synchronization-reference UEs are received, the criterion by which the synchronization-transmitting UE is determined using the RSRP is simultaneously expressed as the following Equation 5 and Equation 6.

$$|RSRP_{I\text{-}SS_1}-RSRP_{I\text{-}SS_2}|\leq Y\ dB \quad \text{Equation 5}$$

$$|RSRP_{I\text{-}SS_1}-RSRP_{I\text{-}SS_3}|\leq Y\ dB \quad \text{Equation 6}$$

The synchronization-transmitting UE determined according to Equation 5 or Equation 6 is a new synchronization-reference UE, synchronization-support UE, or synchronization-relaying UE.

Unlike the embodiments of FIG. 18 and FIG. 19, the synchronization-support UE is determined when all of the received power values of a plurality of synchronization signals are more than X dBm. That is, the synchronization-support UE can be created in the overlapped area of two circles greater than X dBm.

For another example, when a plurality of synchronization channels (including the BCH in the case of the base station) is received, and they are successfully decoded, or when the received power of the synchronization channel is more than a specific threshold, the synchronization-support UE can be created. For another example, unlike the existing embodiment in which the synchronization-reference UE is determine based on the received power of the synchronization signal from the synchronization-reference UE, the determination is made based on the received power of the synchronization signal from the synchronization-support UE. That is, like the embodiment in which, in order to keep a proper distance from each other, the synchronization-reference UE operates as the synchronization-reference UE when there is no synchronization signal greater than X dBm determined by the synchronization reception performance, when there is no synchronization signal more than Y dBm from the synchronization-support UE, the UE operates as a synchronization-support UE. X and Y are the same, in some cases.

In the present disclosure, it is assumed that the base station or the SH UE may send the number of relay hops and the maximum number of available hops when transmitting the synchronization signal and the synchronization channel in the cellular system or in the cluster. That is, the base station and the SH UE includes the number of relay hops of "1" in the synchronization signal and the synchronization channel, and may transmit the same. The synchronization-relaying UE for relaying the same may increase the number of relay hops by one and may send the number of relay hops of "2" through the synchronization signal and the synchronization channel. Whenever the signal passes through the synchronization-relaying UE, the number of relay hops increases, and when the number of relay hops reaches the maximum number of relay hops, the relay may be stopped.

According to an embodiment, the base station may send the maximum number of relay hops through the synchronization signal and the synchronization channel, and the synchronization-relaying UE may decreases the number of relay hops by one to thereby send the number of relay hops of "N−1" through the synchronization signal and the synchronization channel. Whenever the signal passes through the synchronization-relaying UE, the number of relay hops decreases, and when the number of relay hops reaches zero, the relay may be stopped.

Accordingly, the base station does not need to send the maximum number of relay hops. However, the synchronization-reference UE should send the maximum number of relay hops together with the signal in the cluster of the out-of-coverage area. Because the UE in the out-of-coverage area is to select the synchronization signal and the synchronization channel according to the small number of relay hops. The number of relay hops are obtained by subtracting a received value from the maximum number of relay hops.

Provided that the maximum number of relay hops is preliminarily determined, the synchronization-transmitting UE in the out-of-coverage area does not need to send the maximum number of relay hops together with the synchronization signal and the synchronization channel. The UE in the out-of-coverage area may recognize the number of relay hops by subtracting the received value from the predetermined maximum number of relay hops, and may select the synchronization signal and synchronization channel according to the small number of relay hops, or a large value with respect to the received value.

The UE may compare the DFN value or the timer value, based on a predetermined comparison criterion. On the contrary, the UE that can measure an absolute time reference may calculate the DFN value according to a predetermined rule. The UE that can measure an absolute time reference may be a UE adopting devices, such as a GPS device (hereinafter, referred to as a "GPS-available UE"). The GPS-available UE may not follow the comparison rule of the DFN values between the UEs, or may inform the nearby UEs of information stating that it is a GPS-available UE. The nearby UEs that have recognized the GPS-available UE may not follow the existing comparison rule of the DFN values, and may follow the reference timing from the GPS-available UE.

When there is a time difference between the GPS-available UE or the UE that has determined the timing according to the GPS-available UE, and the UE that follows the DFN value determined by the base station, the GPS-available UE or the UE may follow the DFN value determined by the base station in order to support the operation with the base station. To this end, the synchronization signal used in the base station area, and the DFN value included in the synchronization signal is separated from the synchronization signal used outside the base station area, and the DFN value included in the synchronization signal.

When different DFN values are received from the different base stations, the DFN value is selected in the same manner as the operation between the UEs in the out-of-coverage area, according to a predetermined DFN value determination criterion, the priority depending on the base station ID, the received priority of the synchronization signal (e.g., the received power), or the like.

Figure 20:
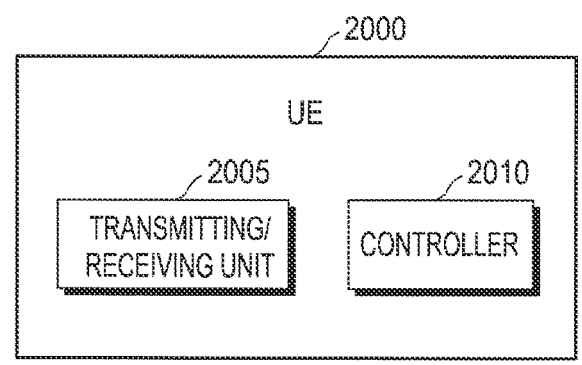
FIG. 20 illustrates a configuration of a UE device according to an embodiment of the present disclosure.

FIG. 20 is an example illustrating a configuration of the UE device according to an embodiment of the present disclosure.

The UE device 200 includes a transmitting/receiving unit 2005 for transmitting and receiving signals to and from other UEs, and a controller 2010 that controls overall operations of the UE device. The operations for supporting the synchronization-support UE set forth above can be performed by the controller 2010. However, the controller 2010 and the transmitting/receiving unit 2005 are not always configured as separate devices, and they can be combined as a single element such as a single chip.

It should be noted that the scope of the present disclosure is not limited to the configuration of the D2D UEs, the D2D synchronization-support methods, the resource frame configuration, and the configuration of the UE device, which are illustrated in FIGS. 1 to 20. That is, not all of elements, entities, or steps of operations shown in FIGS. 1 to 20 are regarded as essential elements for execution of the present disclosure, and the present disclosure is implemented by some elements without departing from the scope of the disclosure.

The above-described operations of the base station or the user equipment can be implemented by including a memory device storing the corresponding program code in any constituent unit within the base station or the user equipment. That is, the controller of the smart module or device performs the above described operations by reading and executing the program code stored in the memory device by means of a processor or a central processing unit (CPU).

The various components of the smart module, device and the like used in the specification operates by using a hardware circuit, for example, a combination of a complementary metal oxide semiconductor based logical circuit, firmware, software and/or hardware, and a combination of firmware and/or software inserted into a machine-readable medium. As an example, various electric configurations and methods can be carried out by using electric circuits such as transistors, logic gates, and an application specific integrated circuit (ASIC).

Although the present disclosure has been described with an exemplary embodiment, various changes and modifications may be suggested to one skilled in the art. It is intended that the present disclosure encompass such changes and modifications as fall within the scope of the appended claims.

What is claimed is:

1. A method for supporting synchronization of a first user equipment (UE) for D2D communication, the method comprising:
   first scanning for checking a synchronization signal transmitted from at least one of a second UEs;
   establishing the first UE as a synchronization-transmitting UE, based on a result of the first scanning;
   transmitting a synchronization channel including timer value information indicating scanning time at which a scanning starts; and
   second scanning based on the timer value information.

2. The method of claim 1, establishing the first UE as the synchronization-transmitting UE, based on the result of the first scanning comprises:
   establishing the first UE as the synchronization-transmitting UE, based on at least one of presence of the synchronization signal transmitted from the at least one of the second UEs, a number of second UEs, the timer value information transmitted from the at least one of the second UEs, quality information of the synchronization signal transmitted from the at least one of the second UEs, and a number of relay hops of the synchronization signal transmitted from the at least one of the second UEs.

3. The method of claim 2, establishing the first UE as the synchronization-transmitting UE, based on the result of the first scanning comprises:
   establishing the first UE as the synchronization-transmitting UE when there is no synchronization signal transmitted from the at least one of the second UEs.

4. The method of claim 2, establishing the first UE as the synchronization-transmitting UE, based on the result of the first scanning comprises:
   establishing the first UE as the synchronization-transmitting UE when there is the synchronization signal transmitted from the at least one of the second UEs and when the quality information of the synchronization signal received from the at least one of the second UEs represents a value being equal to or less than a first threshold value or a difference of quality between the synchronization signals received from at least two at least one of the second UEs is equal to or less than a second threshold value.

5. The method of claim 1, before second scanning, further comprising:
   receiving timer value information from the at least one of the second UEs; and
   changing the first UE's association into one of the second UEs, based on the timer value information from the at least one of the second UEs.

6. The method of claim 1, before second scanning, further comprising:
   configuring the timer value information indicating the scanning time to have a value indicating that the scanning is to be promptly performed.

7. The method of claim 1, wherein the timer value information is expressed as a number of frames using a system frame number or a D2D frame number as a unit, and the number of frames includes a number of remaining frames until the scanning time or a specific frame number corresponding to the scanning time.

8. The method of claim 1, second scanning based on the timer value information comprises:
receiving, in a scanning period indicated by the timer value information, synchronization signals from a D2D communication cluster with which the first UE is associated and a D2D communication cluster with which the first UE is not associated.

9. The method of claim 1, wherein a D2D communication cluster, which the first UE represents or with which the first UE is associated, is identified using a secondary synchronization signal (SSS) of a long term evolution (LTE) standard.

10. The method of claim 1, wherein a number of relay hops of a synchronization signal transmitted from a synchronization head UE for D2D communication is identified using a primary synchronization signal (PSS) of a long term evolution (LTE) standard.

11. The method of claim 1, wherein the first UE is one of a synchronization-reference UE, a synchronization-support UE, or a synchronization-relaying UE.

12. The method of claim 1, wherein the first UE shares synchronization signal transmission resources with another synchronization-transmitting UE in a D2D communication cluster with which the first UE is associated.

13. The method of claim 1, wherein the first UE uses synchronization channel transmission resources that are separated on a frequency axis or on a time axis from another synchronization-transmitting UE in a D2D communication cluster with which the first UE is associated.

14. A method for supporting synchronization of a first user equipment (UE) for D2D communication, the method comprising:
first scanning for checking a synchronization signal transmitted from a at least one of a second UEs;
associating the first UE as a synchronization-receiving UE, based on a result of the first scanning;
receiving at least one synchronization channel including timer value information indicating scanning time at which a scanning starts; and
second scanning based on the timer value information.

15. The method of claim 14, associating the first UE as the synchronization-receiving UE, based on the result of the first scanning comprises:
associating the first UE as the synchronization-receiving UE, based on at least one of presence of the synchronization signal transmitted from the at least one of the second UEs, a number of the second UEs, the timer value information transmitted from the at least one of the second UEs, quality information of the synchronization signal transmitted from the at least one of the second UEs, and a number of relay hops of the synchronization signal transmitted from the at least one of the second UEs.

16. The method of claim 15, associating the first UE as a synchronization-transmitting UE, based on the result of the first scanning comprises:
associating the first UE as the synchronization-receiving UE when there is the synchronization signal transmitted from the at least one of the second UEs and the quality information of the synchronization signal transmitted from the at least one of the second UEs represents a value being equal to or more than a threshold value.

17. The method of claim 14, before second scanning, further comprising:

receiving timer value information from the at least one of the second UEs; and
changing the first UE's association into one of the second UEs, based on the timer value information from the at least one of the second UEs.

18. The method of claim 14, wherein the timer value information is expressed as a number of frames using a system frame number or a D2D frame number as a unit, and the number of frames includes a number of remaining frames until the scanning time or a specific frame number corresponding to the scanning time.

19. The method of claim 14, second scanning based on the timer value information comprises:
receiving, in a scanning period indicated by the timer value information, synchronization signals from a D2D communication cluster with which the first UE is associated and a D2D communication cluster with which the first UE is not associated.

20. The method of claim 14, second scanning based on the timer value information comprises:
suppressing D2D signal transmission in at least one scanning period indicated by the timer value information included in the at least one synchronization channel when the at least one synchronization channel is received from the at least one of the second UEs within a D2D communication cluster with which the first UE is not associated.

21. The method of claim 20, wherein the at least one scanning period in which the D2D signal transmission is suppressed, is determined by priority indicated by the synchronization signal.

22. The method of claim 14, wherein a D2D communication cluster, with which the first UE is associated, is identified using a secondary synchronization signal (SSS) of a long term evolution (LTE) standard.

23. The method of claim 14, wherein a number of relay hops of a synchronization signal transmitted from a synchronization head UE for D2D communication is identified using a primary synchronization signal (PSS) of a long term evolution (LTE) standard.

24. A first user equipment (UE) for supporting synchronization for D2D communication, the first UE comprising:
a controller configured to first scan for checking a synchronization signal transmitted from a at least one of a second UEs, to establish the first UE as a synchronization-transmitting UE, based on a result of first scanning, to transmit a synchronization channel including timer value information indicating scanning time at which a scanning starts, and to second scan based on the timer value information.

25. The first UE of claim 24, wherein the controller is configured to establish the first UE as the synchronization-transmitting UE, based on at least one of presence of the synchronization signal transmitted from the at least one of the second UEs, a number of second UEs, the timer value information transmitted from the at least one of the second UEs, quality information of the synchronization signal transmitted from the at least one of the second UEs, and a number of relay hops of the synchronization signal transmitted from the at least one of the second UEs.

26. The first UE of claim 25, wherein the controller is configured to establish the first UE as the synchronization-transmitting UE when there is no synchronization signal transmitted from the at least one of the second UEs.

27. The first UE of claim 25, wherein the controller is configured to establish the first UE as the synchronization-transmitting UE when there is the synchronization signal transmitted from the at least one of the second UEs and when the quality information of the synchronization signal received from the at least one of the second UEs represents a value being equal to or less than a first threshold value, or a difference of quality between the synchronization signals received from at least two of the second UEs is equal to or less than a second threshold value.

28. The first UE of claim 24, wherein the timer value information is expressed as a number of frames using a system frame number or a D2D frame number as a unit, and the number of frames includes a number of remaining frames until the scanning time, or a specific frame number corresponding to the scanning time.

29. The first UE of claim 24, wherein the controller is configured to receive, in a scanning period indicated by the timer value information, synchronization signals of a D2D communication cluster with which the first UE is associated and a D2D communication cluster with which the first UE is not associated.

30. A first user equipment (UE) for supporting synchronization for D2D communication, the first UE comprising:
a controller configured to first scan for checking a synchronization signal transmitted from a at least one of a second UEs, to associate the first UE as a synchronization-receiving UE, based on the scanning result, to receive at least one synchronization channel including timer value information indicating scanning time at which a scanning starts, and to second scan based on the timer value information.

31. The first UE of claim 30, wherein the controller is configured to associate the first UE as the synchronization-receiving UE, based on at least one of presence of the synchronization signal transmitted from the at least one of the second UEs, a number of the second UEs, the timer value information transmitted from the at least one of the second UEs, quality information of the synchronization signal transmitted from at least one of the second UEs, and a number of relay hops of the synchronization signal transmitted from the at least one of the second UEs.

32. The first UE of claim 31, wherein the controller is configured to associate the first UE as the synchronization-receiving UE when there is the synchronization signal transmitted from the at least one of the second UEs and the quality information of the synchronization signal transmitted from the at least one of the second UEs represents a value being equal to or more than a threshold value.

33. The first UE of claim 30, wherein the timer value information is expressed as a number of frames using a system frame number or a D2D frame number as a unit, and the number of frames includes a number of remaining frames until the scanning time or a specific frame number corresponding to the scanning time.

34. The first UE of claim 30, wherein the controller is configured to receive, in a scanning period indicated by the timer value information, synchronization signals from a D2D communication cluster with which the first UE is associated and a D2D communication cluster with which the first UE is not associated.

35. The first UE of claim 30, wherein the controller is configured to suppress D2D signal transmission in at least one scanning period indicated by the timer value information included in the at least one synchronization channel when the at least one synchronization channel is received from the at least one of the second UEs within a D2D communication cluster with which the first UE is not associated.

36. The first UE of claim 35, wherein the at least one scanning period in which the D2D signal transmission is suppressed, is determined by priority indicated by the synchronization signal.

* * * * *